(12) United States Patent
Asano et al.

(10) Patent No.: US 8,756,670 B2
(45) Date of Patent: Jun. 17, 2014

(54) INFORMATION PROCESSING APPARATUS CAPABLE OF AUTHENTICATION PROCESSING ACHIEVING BOTH OF USER CONVENIENCE AND SECURITY, METHOD OF CONTROLLING INFORMATION PROCESSING APPARATUS, AND RECORDING MEDIUM RECORDING PROGRAM FOR CONTROLLING INFORMATION PROCESSING APPARATUS

(75) Inventors: Motohiro Asano, Osaka (JP); Chiho Murai, Yao (JP)

(73) Assignee: Konica Minolta Holdings, Inc., Chiyoda-Ku, Tokyo (JP)

( * ) Notice: Subject to any disclaimer, the term of this patent is extended or adjusted under 35 U.S.C. 154(b) by 379 days.

(21) Appl. No.: 12/786,838

(22) Filed: May 25, 2010

(65) Prior Publication Data
US 2010/0306842 A1 Dec. 2, 2010

(30) Foreign Application Priority Data

Jun. 2, 2009 (JP) ................................. 2009-133216

(51) Int. Cl.
| | | |
|---|---|---|
| G06F 7/04 | (2006.01) | |
| H04L 29/06 | (2006.01) | |
| G06F 21/31 | (2013.01) | |
| H04W 12/06 | (2009.01) | |

(52) U.S. Cl.
CPC .............. *H04L 63/105* (2013.01); *H04L 63/08* (2013.01); *G06F 21/31* (2013.01); *H04W 12/06* (2013.01)
USPC ....................................... 726/7; 726/5; 726/6

(58) Field of Classification Search
CPC ....... H04L 63/105; H04L 63/08; G06F 21/31; H04W 12/06
USPC ........... 726/1–7, 16–19, 27, 28; 713/182, 183
See application file for complete search history.

(56) References Cited

U.S. PATENT DOCUMENTS 5,699,514 A * 12/1997 Durinovic-Johri et al. ...... 726/19
5,875,345 A *  2/1999 Naito et al. .................... 713/323
(Continued)

FOREIGN PATENT DOCUMENTS

| JP | 03-051946 A | 3/1991 |
|---|---|---|
| JP | 2001-268649 A | 9/2001 |

(Continued)

OTHER PUBLICATIONS

Wayne Jansen "Authentication mobile device users through image selection", NIST 2004, 10 pages.*

(Continued)

*Primary Examiner* — Catherine Thiaw
(74) *Attorney, Agent, or Firm* — Buchanan Ingersoll Rooney PC

(57) ABSTRACT

Whether a log-in button has been pressed or not is determined. When it is determined that the log-in button has been pressed, an ID selection screen is displayed. Whether an ID has been selected or not is determined. When it is determined that an ID has been selected, whether a secure printing job is present or not is determined. Thereafter, whether password matching is successfully achieved or not is determined. Thereafter, whether a password image function is ON or not is determined. Then, when it is determined that password matching was successfully achieved and a password image authentication function is ON, password image authentication is carried out.

17 Claims, 34 Drawing Sheets

(56) References Cited

U.S. PATENT DOCUMENTS

| | | | |
|---|---|---|---|
| 5,928,364 A * | 7/1999 | Yamamoto | 726/18 |
| 6,360,326 B1 * | 3/2002 | Hiles | 726/19 |
| 7,100,203 B1 * | 8/2006 | Tosey | 726/17 |
| RE39,808 E * | 9/2007 | Motegi | 358/1.14 |
| 7,619,766 B2 | 11/2009 | Tsuzuki | 358/1.15 |
| 7,650,509 B1 * | 1/2010 | Dunning | 713/184 |
| 8,094,812 B1 * | 1/2012 | Tsang et al. | 380/28 |
| 8,127,141 B2 | 2/2012 | Hypponen | |
| 2001/0030644 A1 * | 10/2001 | Allport | 345/173 |
| 2004/0218763 A1 * | 11/2004 | Rose et al. | 380/277 |
| 2004/0225880 A1 * | 11/2004 | Mizrah | 713/155 |
| 2005/0044425 A1 * | 2/2005 | Hypponen | 713/202 |
| 2006/0075092 A1 * | 4/2006 | Kidokoro | 709/224 |
| 2006/0101279 A1 | 5/2006 | Akita | |
| 2006/0259960 A1 * | 11/2006 | Kondo | 726/6 |
| 2007/0250920 A1 * | 10/2007 | Lindsay | 726/7 |
| 2008/0034207 A1 * | 2/2008 | Cam-Winget et al. | 713/163 |
| 2008/0034412 A1 * | 2/2008 | Wahl | 726/8 |
| 2008/0052245 A1 * | 2/2008 | Love | 705/76 |
| 2008/0068227 A1 * | 3/2008 | Ogasawara | 341/23 |
| 2008/0100865 A1 * | 5/2008 | Okano | 358/1.15 |
| 2008/0104410 A1 * | 5/2008 | Brown et al. | 713/182 |
| 2008/0115223 A1 * | 5/2008 | Morris et al. | 726/27 |
| 2008/0195976 A1 * | 8/2008 | Cho et al. | 715/840 |
| 2008/0250477 A1 * | 10/2008 | Samuelsson et al. | 726/4 |
| 2009/0064289 A1 * | 3/2009 | Jang | 726/4 |
| 2009/0113543 A1 * | 4/2009 | Adams et al. | 726/18 |
| 2009/0165125 A1 * | 6/2009 | Brown et al. | 726/21 |
| 2009/0276837 A1 * | 11/2009 | Abzarian et al. | 726/5 |
| 2009/0296129 A1 * | 12/2009 | Hirose | 358/1.14 |
| 2009/0300733 A1 * | 12/2009 | Inomata et al. | 726/5 |
| 2009/0307765 A1 * | 12/2009 | Mardikar et al. | 726/7 |
| 2010/0017860 A1 * | 1/2010 | Ishida | 726/7 |
| 2010/0077457 A1 * | 3/2010 | Xu et al. | 726/4 |
| 2010/0100945 A1 * | 4/2010 | Ozzie et al. | 726/5 |
| 2010/0138914 A1 * | 6/2010 | Davis et al. | 726/19 |
| 2010/0146606 A1 * | 6/2010 | Delia et al. | 726/7 |

FOREIGN PATENT DOCUMENTS

| | | |
|---|---|---|
| JP | 2003-228553 A | 8/2003 |
| JP | 2005-507518 A | 3/2005 |
| JP | 2005-335282 A | 12/2005 |
| JP | 2005-346310 A | 12/2005 |
| JP | 2006-072833 A | 3/2006 |
| JP | 2006-130879 A | 5/2006 |
| JP | 2006-185315 A | 7/2006 |
| JP | 2007-034345 A | 2/2007 |
| JP | 2008-146449 A | 6/2008 |
| JP | 2008-282298 A | 11/2008 |
| WO | 03/038569 A2 | 5/2003 |

OTHER PUBLICATIONS

Office Action from the Japan Patent Office dated May 7, 2013, issued in corresponding Japanese Patent Application No. 2009-133216, with English translation thereof. (10 pages).

Kubohchi et al., "The Password Input Interface Suitable for Primary School Children," The Institute of Electronics, Information and Cmmunicaiton Engineers, Mar. 1, 2002, vol. 101, No. 706, with English abstract thereof. (8 pages).

Office Action from the Japan Patent Office dated Aug. 27, 2013, issued in corresponding Japanese Patent Application No. 2009-133216, with English translation thereof. (10 pages).

Decision from the Japan Patent Office dated Dec. 3, 2013, issued in corresponding Japanese Patent Application No. 2009-133216, with English translation thereof. (2 pages).

Office Action from the Japan Patent Office dated Dec. 3, 2013, issued in corresponding Japanese Patent Application No. 2009-133216, with English translation thereof. (7 pages).

\* cited by examiner

FIG.8

| USER ID | PASSWORD | PASSWORD IMAGE | ON OR OFF OF PASSWORD IMAGE AUTHENTICATION FUNCTION | AUTHENTICATION TIME |
|---------|----------|----------------|----------------------------------------------------|---------------------|
| Alice   | Ow8gcA   | (NONE)         | OFF                                                | 08/12/14 17:03:15   |
| Bob     | wQ9DspX  | ✺              | ON                                                 | 09/1/7 11:20:34     |
| Charlie | ...      | ...            | ...                                                | ...                 |
| David   |          |                |                                                    |                     |
| Erik    |          |                |                                                    |                     |
| Fred    |          |                |                                                    |                     |

| USER ID | PASSWORD | PASSWORD IMAGE | ON OR OFF OF PASSWORD IMAGE AUTHENTICATION FUNCTION | AUTHENTICATION TIME |
|---|---|---|---|---|
| Alice | Ow8gcA | (NONE) | OFF | 08/12/14 17:03:15 |
| Bob | | | | |
| Charlie | | | | |
| David | | | | |
| Erik | | | | |
| Fred | | | | |

(B)

| USER ID | PASSWORD | PASSWORD IMAGE | ON OR OFF OF PASSWORD IMAGE AUTHENTICATION FUNCTION | AUTHENTICATION TIME |
|---|---|---|---|---|
| Alice | Ow8gcA | (NONE) | OFF | 08/12/14 17:03:15 |
| Bob | wQ9DspX | ✸ | ON | 09/1/7 11:20:34 |
| Charlie | | | | |
| David | | | | |
| Erik | | | | |
| Fred | | | | |

| USER ID | PASSWORD | PASSWORD IMAGE | ON OR OFF OF PASSWORD IMAGE AUTHENTICATION FUNCTION | AUTHENTICATION TIME |
|---|---|---|---|---|
| Alice | Ow8gcA | (NONE) | OFF | 08/12/14 17:03:15 |
| Bob | wQ9DspX | ☀ | ON | 09/1/7 11:20:34 |
| Charlie | | | | |
| David | | | | |
| Erik | | | | |
| Fred | | | | |

(B)

| USER ID | PASSWORD | PASSWORD IMAGE | ON OR OFF OF PASSWORD IMAGE AUTHENTICATION FUNCTION | AUTHENTICATION TIME |
|---|---|---|---|---|
| Alice | Ow8gcA | (NONE) | OFF | 08/12/14 17:03:15 |
| Bob | wQ9DspX | ☀ | ON | 09/1/7 11:35:14 |
| Charlie | | | | |
| David | | | | |
| Erik | | | | |
| Fred | | | | |

(C)

| USER ID | PASSWORD | PASSWORD IMAGE | ON OR OFF OF PASSWORD IMAGE AUTHENTICATION FUNCTION | AUTHENTICATION TIME |
|---|---|---|---|---|
| Alice | Ow8gcA | (NONE) | OFF | 08/12/14 17:03:15 |
| Bob | wQ9DspX | (NONE) | OFF | (NONE) |
| Charlie | | | | |
| David | | | | |
| Erik | | | | |
| Fred | | | | |

| USER ID | PASSWORD | PASSWORD IMAGE | AUTHENTICATION TIME |
|---|---|---|---|
| Alice | Ow8gcA | (NONE) | 08/12/14 17:03:15 |
| Bob | | | |
| Charlie | | | |
| David | | | |
| Erik | | | |
| Fred | | | |

(B)

| USER ID | PASSWORD | PASSWORD IMAGE | AUTHENTICATION TIME |
|---|---|---|---|
| Alice | Ow8gcA | (NONE) | 08/12/14 17:03:15 |
| Bob | wQ9DspX | ✹ | 09/1/7 11:20:34 |
| Charlie | | | |
| David | | | |
| Erik | | | |
| Fred | | | |

| USER ID | PASSWORD | PASSWORD IMAGE | AUTHENTICATION TIME |
|---|---|---|---|
| Alice | Ow8gcA | (NONE) | 08/12/14 17:03:15 |
| Bob | wQ9DspX | ☀ | 09/1/7 11:20:34 |
| Charlie | | | |
| David | | | |
| Erik | | | |
| Fred | | | |

(B)

| USER ID | PASSWORD | PASSWORD IMAGE | AUTHENTICATION TIME |
|---|---|---|---|
| Alice | Ow8gcA | (NONE) | 08/12/14 17:03:15 |
| Bob | wQ9DspX | ☀ | 09/1/7 11:35:14 |
| Charlie | | | |
| David | | | |
| Erik | | | |
| Fred | | | |

(C)

| USER ID | PASSWORD | PASSWORD IMAGE | AUTHENTICATION TIME |
|---|---|---|---|
| Alice | Ow8gcA | (NONE) | 08/12/14 17:03:15 |
| Bob | wQ9DspX | (NONE) | (NONE) |
| Charlie | | | |
| David | | | |
| Erik | | | |
| Fred | | | |

| USER ID | FIRST PASSWORD | SECOND (SIMPLIFIED) PASSWORD | AUTHENTICATION TIME |
|---|---|---|---|
| Alice | Ow8gcA | (NONE) | 08/12/14 17:03:15 |
| Bob | | | |
| Charlie | | | |
| David | | | |
| Erik | | | |
| Fred | | | |

(B)

| USER ID | FIRST PASSWORD | SECOND (SIMPLIFIED) PASSWORD | AUTHENTICATION TIME |
|---|---|---|---|
| Alice | Ow8gcA | (NONE) | 08/12/14 17:03:15 |
| Bob | wQ9DspX | wQ | 09/1/7 11:20:34 |
| Charlie | | | |
| David | | | |
| Erik | | | |
| Fred | | | |

| USER ID | FIRST PASSWORD | SECOND (SIMPLIFIED) PASSWORD | AUTHENTICATION TIME |
|---|---|---|---|
| Alice | Ow8gcA | (NONE) | 08/12/14 17:03:15 |
| Bob | wQ9DspX | wQ | 09/1/7 11:20:34 |
| Charlie | | | |
| David | | | |
| Erik | | | |
| Fred | | | |

(B)

| USER ID | FIRST PASSWORD | SECOND (SIMPLIFIED) PASSWORD | AUTHENTICATION TIME |
|---|---|---|---|
| Alice | Ow8gcA | (NONE) | 08/12/14 17:03:15 |
| Bob | wQ9DspX | wQ | 09/1/7 11:35:14 |
| Charlie | | | |
| David | | | |
| Erik | | | |
| Fred | | | |

(C)

| USER ID | FIRST PASSWORD | SECOND (SIMPLIFIED) PASSWORD | AUTHENTICATION TIME |
|---|---|---|---|
| Alice | Ow8gcA | (NONE) | 08/12/14 17:03:15 |
| Bob | wQ9DspX | (NONE) | (NONE) |
| Charlie | | | |
| David | | | |
| Erik | | | |
| Fred | | | |

INFORMATION PROCESSING APPARATUS CAPABLE OF AUTHENTICATION PROCESSING ACHIEVING BOTH OF USER CONVENIENCE AND SECURITY, METHOD OF CONTROLLING INFORMATION PROCESSING APPARATUS, AND RECORDING MEDIUM RECORDING PROGRAM FOR CONTROLLING INFORMATION PROCESSING APPARATUS

This application is based on Japanese Patent Application No. 2009-133216 filed with the Japan Patent Office on Jun. 2, 2009, the entire content of which is hereby incorporated by reference.

BACKGROUND OF THE INVENTION

1. Field of the Invention

The present invention relates to an information processing apparatus performing authentication processing, a method of controlling an information processing apparatus, and a program for controlling an information processing apparatus.

2. Description of the Related Art

A printer or an MFP (Multi Function Peripheral) adapted to secure printing has conventionally been available. Secure printing refers to a function for having a password set at the time of printing by means of a printer driver and allowing print output as the password is successfully entered through a panel of a printer main body.

This function has increasingly been used, with growing tendency toward enhanced security of information among the general public.

In many cases, however, a user has been required to enter the same password each time he/she performs printing despite the fact that he/she repeatedly uses the same password previously set by means of the printer driver, and it has been very inconvenient.

In particular, many models of printers or MFPs are not provided with a keyboard as hardware and require input through a software keyboard or the like, which resulted in a time-consuming input operation and inconvenience.

In order to solve this problem, as described in Japanese Laid-Open Patent Publication No. 2005-335282, an IC card may also be used. Specifically, a scheme has been proposed, in which authentication information is registered in an IC card, the authentication information registered in the IC card is read for personal authentication, and then printing processing is performed.

It has been necessary, however, to provide a printer or an MFP with a function to read an IC card, which led to increase in cost.

Meanwhile, Japanese Laid-Open Patent Publication No. 2003-228553 proposes as a simplified authentication method, an authentication method for having a user select an image stored in a storage unit (a registered image) from among a plurality of pieces of image information.

On the other hand, for example, always selecting one piece of image information from among a plurality of pieces of image information for secure printing may be insufficient to ensure security.

SUMMARY OF THE INVENTION

The present invention was made to solve the above-described problems. An object of the present invention is to provide an information processing apparatus capable of performing authentication processing ensuring security to some extent in consideration of user's convenience, a method of controlling an information processing apparatus, and a program for controlling an information processing apparatus.

An information processing apparatus according to one aspect of the present invention includes a display for displaying an authentication screen and a controller for performing authentication processing in response to a user's input instruction on the authentication screen. The controller is capable of executing as the authentication processing, at least one of a first authentication scheme and a second authentication scheme more simplified than the first authentication scheme. When authentication processing in accordance with the first authentication scheme led to approval in response to the user's input instruction, the controller executes the second authentication scheme in next authentication processing.

Preferably, the first authentication scheme corresponds to password authentication.

Preferably, the second authentication scheme corresponds to authentication using a password image.

Preferably, the second authentication scheme corresponds to password authentication restricted in the number of characters, which is smaller than in the first authentication scheme.

In particular, password authentication in accordance with the first authentication scheme is approved when first registered key data registered in advance matches with key data input in accordance with the user's input instruction. In password authentication restricted in the number of characters, key data generated under a prescribed rule from the first registered key data is registered as second registered key data.

In particular, the second registered key data corresponds to data obtained by extracting a part of a character string of the first registered key data.

In particular, the second registered key data corresponds to data obtained by replacing a character in the first registered key data with a different character.

Preferably, the controller causes the display to display registered key data to be used in the second authentication scheme when authentication processing in accordance with the first authentication scheme led to approval in response to the user's input instruction.

Preferably, the first authentication scheme corresponds to authentication in a secure printing function.

Preferably, the first authentication scheme corresponds to authentication for logging in the apparatus.

Preferably, in the first authentication scheme, an instruction to enter at least one of a user ID and a password is issued.

Preferably, when authentication processing in accordance with the second authentication scheme led to approval in response to the user's input instruction, the controller has a time and day of approval registered.

In particular, the controller checks a validity period during which authentication processing in accordance with the second authentication scheme is permitted.

In particular, the controller performs authentication processing in accordance with the second authentication scheme during the validity period during which authentication processing in accordance with the second authentication scheme is permitted, based on the time and day of approval.

In particular, the controller updates the time and day of approval when authentication processing in accordance with the second authentication scheme led to approval.

Preferably, when authentication processing in accordance with the second authentication scheme failed, the controller executes the first authentication scheme.

A method of controlling an information processing apparatus according to one aspect of the present invention includes the steps of displaying an authentication screen and performing authentication processing in accordance with at least one of a first authentication scheme and a second authentication scheme more simplified than the first authentication scheme, in response to a user's input instruction on the authentication screen. In the step of performing authentication processing, when authentication processing in accordance with the first authentication scheme led to approval in response to the user's input instruction, the second authentication scheme is executed in next authentication processing.

A recording medium recording a control program executed in a computer representing an information processing apparatus according to one aspect of the present invention is provided, and the control program causes a computer to perform processing including the steps of displaying an authentication screen and performing authentication processing in accordance with at least one of a first authentication scheme and a second authentication scheme more simplified than the first authentication scheme, in response to a user's input instruction on the authentication screen, and in the step of performing authentication processing, when authentication processing in accordance with the first authentication scheme led to approval in response to the user's input instruction, the second authentication scheme is executed in next authentication processing.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram illustrating an authentication table stored in an authentication data storage unit 36.

FIG. 12 is a diagram illustrating a flow of processing in registration in the authentication table according to the first embodiment of the present invention when password authentication processing is performed.

FIG. 15 is a diagram illustrating a flow of processing in registration in the authentication table according to the first embodiment of the present invention when password image authentication processing is performed.

FIG. 26 is a diagram illustrating a flow of processing in registration in an authentication table according to the second embodiment of the present invention when password authentication processing is performed.

FIG. 29 is a diagram illustrating a flow of processing in registration in the authentication table according to the second embodiment of the present invention when password image authentication processing is performed.

FIG. 35 is a diagram illustrating a flow of processing in registration in an authentication table according to the third embodiment of the present invention when password authentication processing is performed.

FIG. 38 is a diagram illustrating a flow of processing in registration in the authentication table according to the third embodiment of the present invention when second password authentication processing is performed.

DESCRIPTION OF THE PREFERRED EMBODIMENTS

Figure 1:
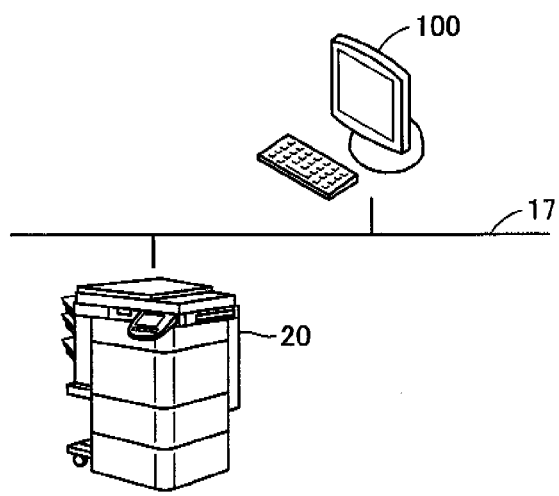
FIG. 1 is a diagram illustrating an information processing system 1 according to a first embodiment of the present invention.

An embodiment of the present invention will be described hereinafter in detail with reference to the drawings. In the drawings, the same or corresponding elements have the same reference characters allotted, and description thereof will not be repeated.

[First Embodiment]

An information processing system 1 according to a first embodiment of the present invention will be described with reference to FIG. 1.

Referring to FIG. 1, here, a case where a personal computer (hereinafter simply also referred to as a PC) 100 representing a terminal device and an MFP 20 are connected to each other through a LAN (Local Area Network) 17 is shown.

PC 100 and MFP 20 are connected to each other so that data can be transmitted and received through LAN 17, and in the present first embodiment, image data created on an application executed on PC 100 is output as a print job to MFP 20, A case where MFP 20 receives a print job transmitted from PC 100 and performs printing processing will be described.

Though a configuration where a single PC is connected as a terminal device to LAN 17 is described here, the number of devices is not limited to one and at least one device is only necessary. In addition, WAN (Wide Area Network) and the like may be employed, without limited to LAN.

A schematic block diagram of MFP 20 according to the first embodiment of the present invention will be described with reference to FIG. 2.

Figure 2:
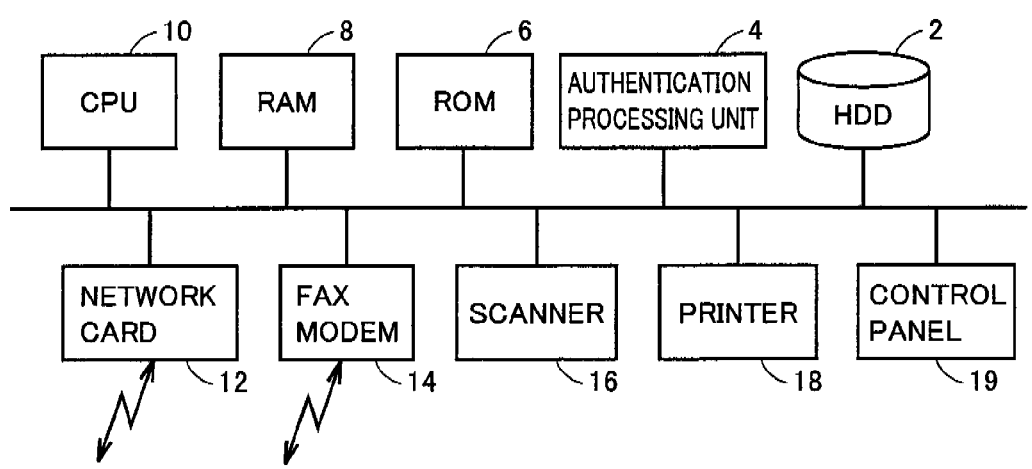
FIG. 2 is a diagram illustrating a schematic block diagram of an MFP 20 according to the first embodiment of the present invention.

Referring to FIG. 2, MFP 20 according to the first embodiment of the present invention includes an HDD 2, an authentication processing unit 4, a ROM 6, a RAM 8, a CPU 10, a network card 12, a FAX modem 14, a scanner 16, a printer 18, and a control panel 19. These components are connected to one another through an internal bus and data can be transmitted and received thereamong.

HDD 2 is an area for storing various types of data.

Authentication processing unit 4 is a part executing authentication processing which will be described later.

ROM (Read Only Memory) 6 is a storage area in which a software program used for attaining a prescribed function in MFP 20 is stored.

RAM (Random Access Memory) 8 is used as a work area of CPU 10.

CPU 10 controls the entire MFP 20 and outputs a prescribed instruction to each component.

Network card 12 is an interface connected to external LAN 17, and for example, it receives a print job from PC 100. The received print job is stored in RAM 8. Then, print data (rendering data) included in the print job stored in RAM 8 is developed so that print data is printed on a prescribed sheet of paper.

FAX modem 14 performs a FAX function.

Scanner 16 reads a document set on a not-shown carrier and obtains image data.

Printer 18 prints image data on a prescribed sheet of paper.

Control panel 19 accepts user's various operation inputs and displays various types of setting information thereon.

A schematic block diagram of PC 100 according to the first embodiment of the present invention will be described with reference to FIG. 3.

Figure 3:
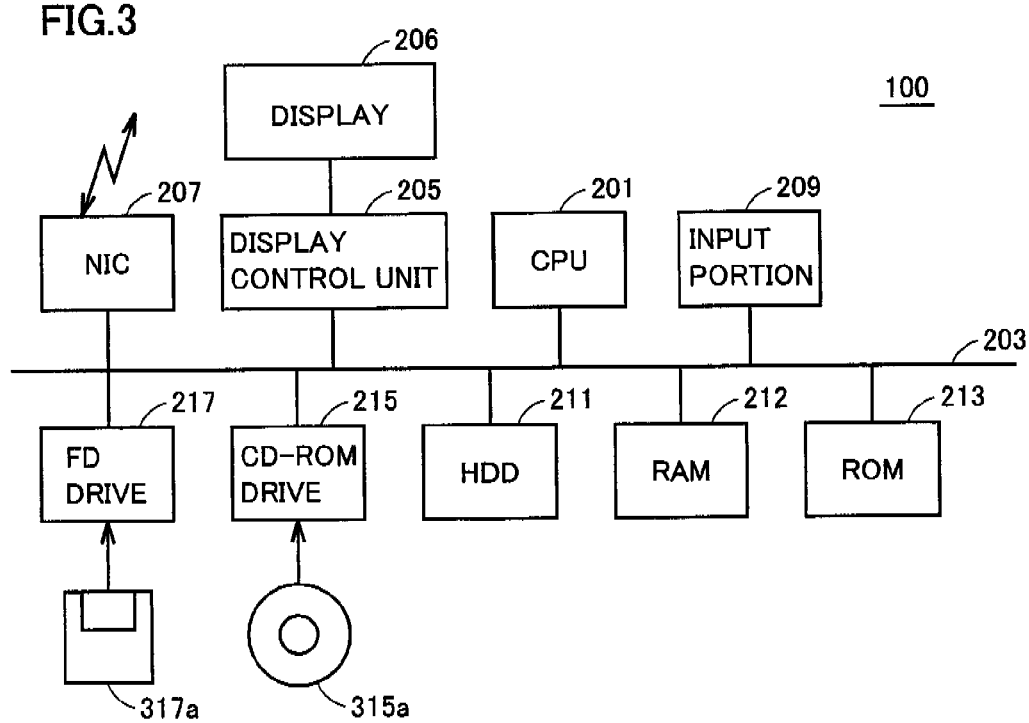
FIG. 3 is a diagram illustrating a schematic block diagram of a PC 100 according to the first embodiment of the present invention.

Referring to FIG. 3, PC 100 according to the embodiment of the present invention is constituted of a main body portion, display means, and input means.

The display means corresponds to a display 206. In addition, an input portion 209 is implemented by a keyboard serving as key input means, a mouse representing a pointing device, or the like.

Though the description will be given in the present embodiment assuming that display 206 and input portion 209 are integrally formed, they may separately be formed.

Display 206 may be a liquid crystal display device, a CRT (Cathode Ray Tube) display device or a plasma display device, and any device capable of display may be employed.

The main body portion includes a CPU (Central Processing Unit) 201 for executing various programs including an operating system (OS), a RAM 212 for temporarily storing data necessary for execution of a program portion of CPU 201, a hard disk portion (HDD: Hard Disk Drive) 211 for storing a program executed by CPU 201 or data in a non-volatile manner, and a ROM 213 for storing in advance a program executed by CPU 201. ROM 213 or HDD 211 stores basic software (OS) in advance and various applications are executed by execution of the OS.

In addition, HDD 211 stores a printer driver which is a software program for transmitting a print job to MFP 20, and a function as will be described later is attained as a result of reading of the printer driver by CPU 201.

Such a program is read from a flexible disc 317a, a CD-ROM (Compact Disc-Read Only Memory) 315a or the like by an FD drive 217 or a CD-ROM drive 215. Then, the read program is stored in HDD 211 for use.

CPU 201 receives a user's instruction through input portion 209 and outputs a screen output generated by execution of a program to a display control unit 205.

Display control unit 205 outputs a screen output to display 206.

In addition, CPU 201 transmits a print job to MFP 20 connected to LAN 17 (or WAN or the like) through a network interface card (NIC) 207 implemented by a LAN card or the like.

The components described above transmit and receive data through an internal bus 203 among one another.

Print setting processing in PC 100 according to the first embodiment of the present invention will be described with reference to FIG. 4.

Figure 4:
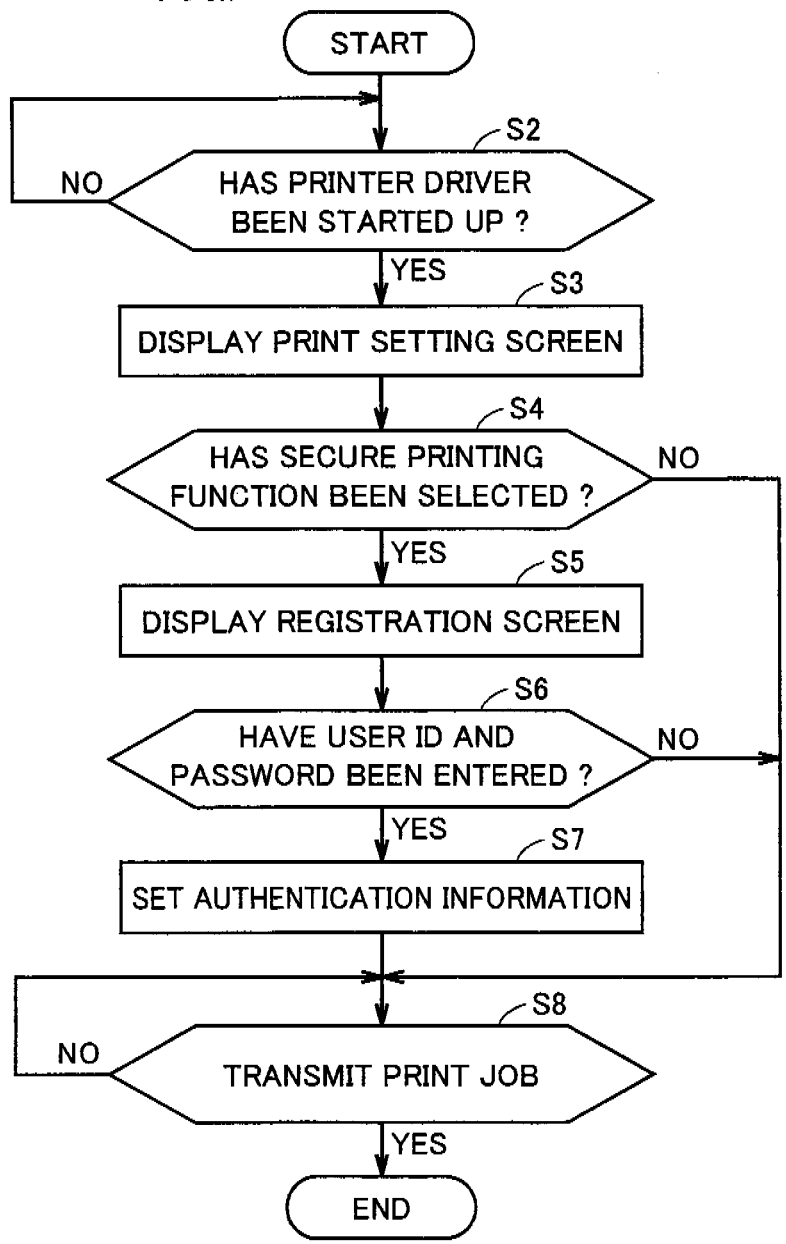
FIG. 4 is a flowchart illustrating print setting processing in PC 100 according to the first embodiment of the present invention.

Referring to FIG. 4, initially, whether a printer driver has been started up or not is determined (step S2).

Specifically, CPU 201 determines whether or not an instruction to start up a printer driver has been issued through a mouse, a keyboard, or the like. When it is determined that the printer driver has been started up, a print setting screen is displayed (step S3).

A print setting screen 40 displayed on display 206 by starting up a printer driver will be described with reference to FIG. 5.

Figure 5:
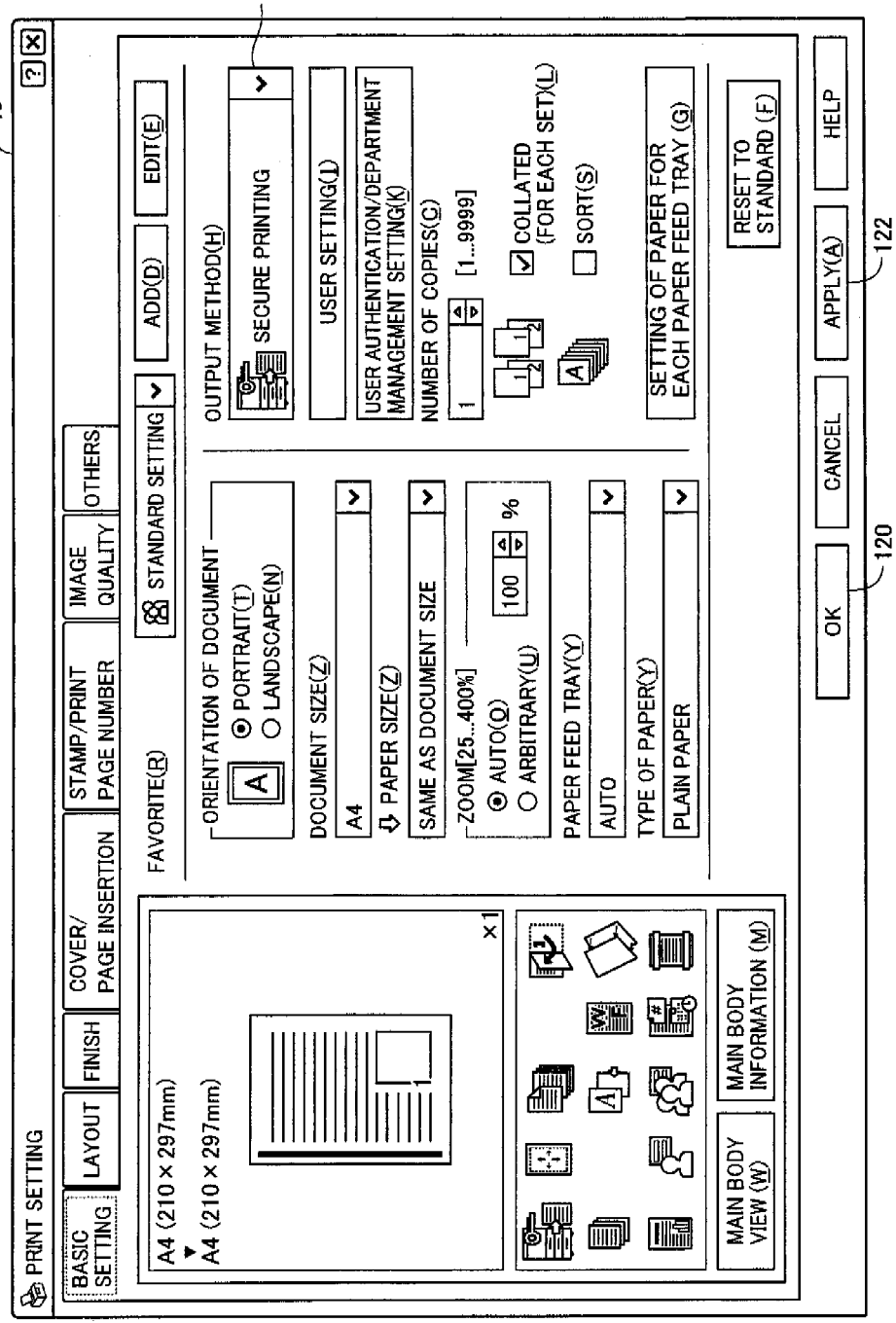
FIG. 5 is a diagram illustrating a print setting screen 40 displayed on a display 206 by starting up a printer driver.

Referring to FIG. 5, in print setting screen 40, a plurality of setting items of various types relating to setting of a print environment can be set. Specifically, for example, by designating a plurality of tabs categorized for each setting item and provided in an upper portion by using a mouse representing a pointing device, a keyboard or the like, setting relating to various print environments can be made.

By designating various types of tabs, setting items or the like with a mouse or the like, for example, printing paper can be selected, or image quality, the number of copies or the like can be set.

In the present embodiment, various types of setting items in a case where a "basic setting" tab relating to basic setting was designated are displayed by way of example.

For example, an item for setting an orientation of a document and a size of a document is provided by way of example. In addition, an item button 116 relating to setting of an output method is shown. By designating item button 116, the user can perform an operation for changing setting for various output methods such as "normal printing", "secure printing" and the like, for example, by using a pull-down menu.

In the present first embodiment, a case where secure printing is set as the setting item for the output method by using a mouse representing a pointing device will be described.

Unlike normal printing, "secure" printing is a function for allowing print output of image data included in a print job when authentication information such as a password is set in transmission of a print job and a password is entered through a panel on MFP 20 and then checked. With this function, such a problem that the print job is executed, print output is made but the output is left, leading to leakage of contents, can be avoided.

Here, in a lower region of print setting screen 40, an "apply" item button is provided. As the user designates an apply button 122 using a mouse or the like representing a pointing device, the set content, that is, secure printing in the present embodiment, is set.

Referring again to FIG. 4, whether a secure printing function has been selected or not is then determined (step S4). Specifically, CPU 20 can make determination based on whether or not secure printing has been designated as a setting item for the output method on print setting screen 40 by using the mouse.

When it is determined in step S4 that the secure printing function has been selected (YES in step S4), CPU 20 then has a registration screen displayed (step S5).

A screen 124 for registering authentication information in carrying out secure printing will be described with reference to FIG. 6.

Figure 6:
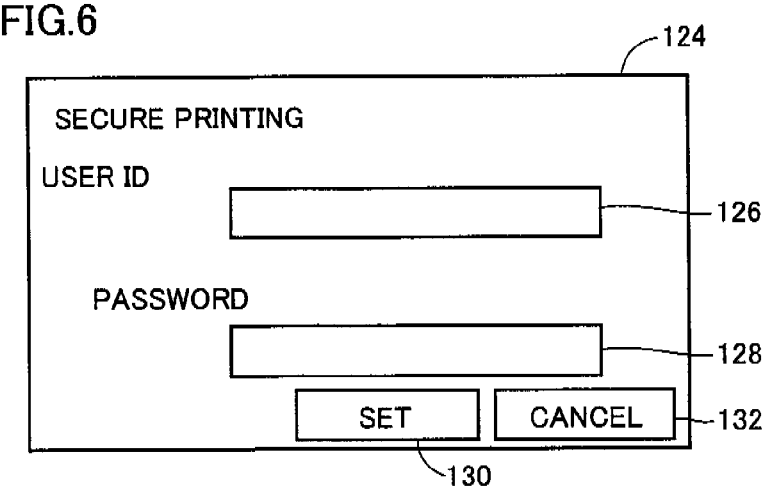
FIG. 6 is a diagram illustrating a screen 124 for registering authentication information in carrying out secure printing.

Referring to FIG. 6, here, a case where input fields 126 and 128 for entering a user ID and a password to be registered as authentication information used in execution of secure printing are provided is shown.

As described above, registration screen 124 is displayed by designating apply button 122 in print setting screen 40 in FIG. 5.

A user ID can be entered in input field 126 by using a keyboard or the like, and a password can be entered in input field 128 by using a keyboard or the like.

Here, in a lower region of registration screen 124, a "set" item button is provided. As the user designates a set button 130 by using a mouse or the like representing a pointing device, setting as authentication information in secure printing is made.

On the other hand, by designating a "cancel" button 132, the process can end without setting authentication information in the registration screen for secure printing.

Referring again to FIG. 4, then, whether a user ID and a password have been entered or not is determined (step S6). Specifically, determination is made based on whether or not input was made in input fields 126 and 128 and the "set" item button was designated in the registration screen.

When it is determined in step S6 that the user ID and the password were entered (YES in step S6), CPU 201 then sets authentication information (step S7).

Thereafter, whether a print job has been transmitted or not is determined (step S8).

Specifically, determination is made based on whether or not the user designated an OK button 120 by using a mouse or the like representing a pointing device in print setting screen 40 in FIG. 5. When the OK button was designated, a print job is transmitted from PC 100 to MFP 20 and the process ends (end).

In the first embodiment of the present invention, an authentication scheme convenient for the user in a case where a secure printing job is transmitted from PC 100 to MFP 20 a plurality of times will be described.

Briefly speaking, in authentication for the first time, password authentication is carried out, and subsequently, in next authentication, password image authentication is carried out.

A functional block in authentication processing unit 4 according to the first embodiment of the present invention will be described with reference to FIG. 7.

Figure 7:
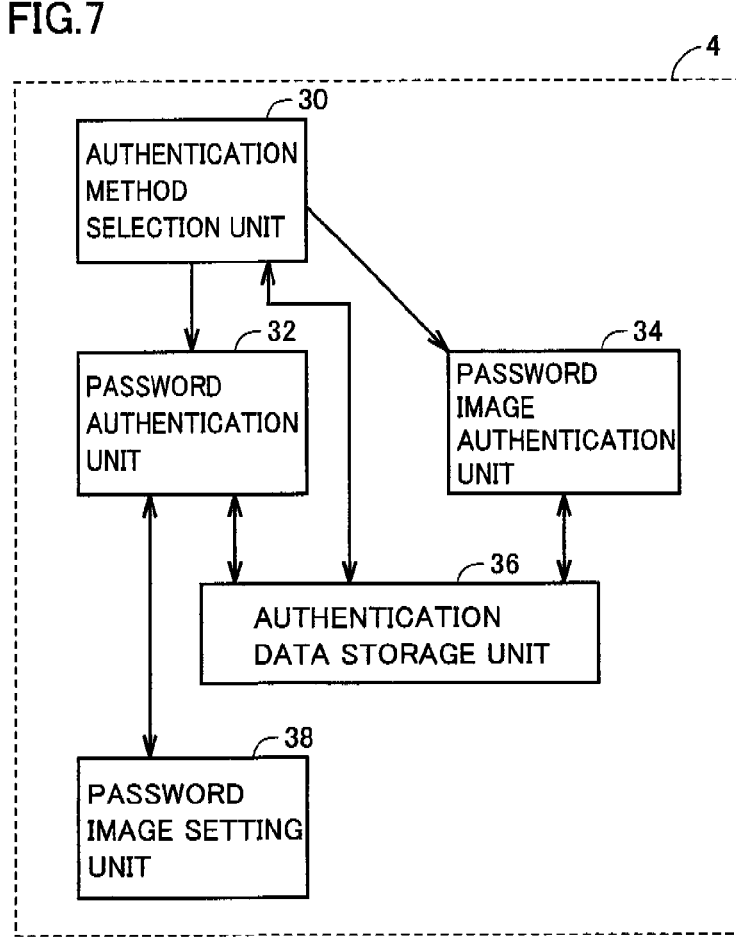
FIG. 7 is a diagram illustrating a functional block in an authentication processing unit 4 according to the first embodiment of the present invention.

Referring to FIG. 7, authentication processing unit 4 includes an authentication method selection unit 30, a password authentication unit 32, a password image authentication unit 34, an authentication data storage unit 36, and a password image setting unit 38.

Authentication method selection unit 30 selects between authentication processing using password authentication unit 32 and authentication processing using password image authentication unit 34.

Password authentication unit 32 carries out password authentication in accordance with a user's input instruction.

Password image authentication unit 34 carries out image authentication in accordance with a user's input instruction.

Authentication data storage unit 36 has an authentication table in which authentication data to be used for authentication is stored.

Though the description will be given later, password image setting unit 38 sets an image to be used in password image authentication unit 34.

The authentication table stored in authentication data storage unit 36 will be described with reference to FIG. 8.

Referring to FIG. 8, a table in which a user ID, a password, ON or OFF of a function to authenticate password image, and an authentication time are registered is shown.

Specifically, a case where "Alice", "Bob", "Charlie", "David", "Erik", and "Fred" are registered as user IDs is shown.

A case where a password "Ow8gcA", a password image "none", ON or OFF of password image authentication function "OFF", and an authentication time "08/12/14 17:03:15" are registered in correspondence with the user ID "Alice" is shown by way of example. Though the description will be given later, ON or OFF of the password image authentication function is a flag for determining whether or not to carry out password image authentication. In addition, though the description will be given later, the authentication time is used for determining lapse of time since previous authentication.

In addition, a case where a password "wQ9DspX", a password image "YES (an image object 310 in FIG. 10)", ON or OFF of password image authentication function "ON", and an authentication time "09/1/7 11:20:34" are registered in correspondence with the user ID "Bob" is shown by way of another example.

Secure printing processing in MFP 20 according to the first embodiment of the present invention will be described with reference to FIG. 9.

Figure 9:
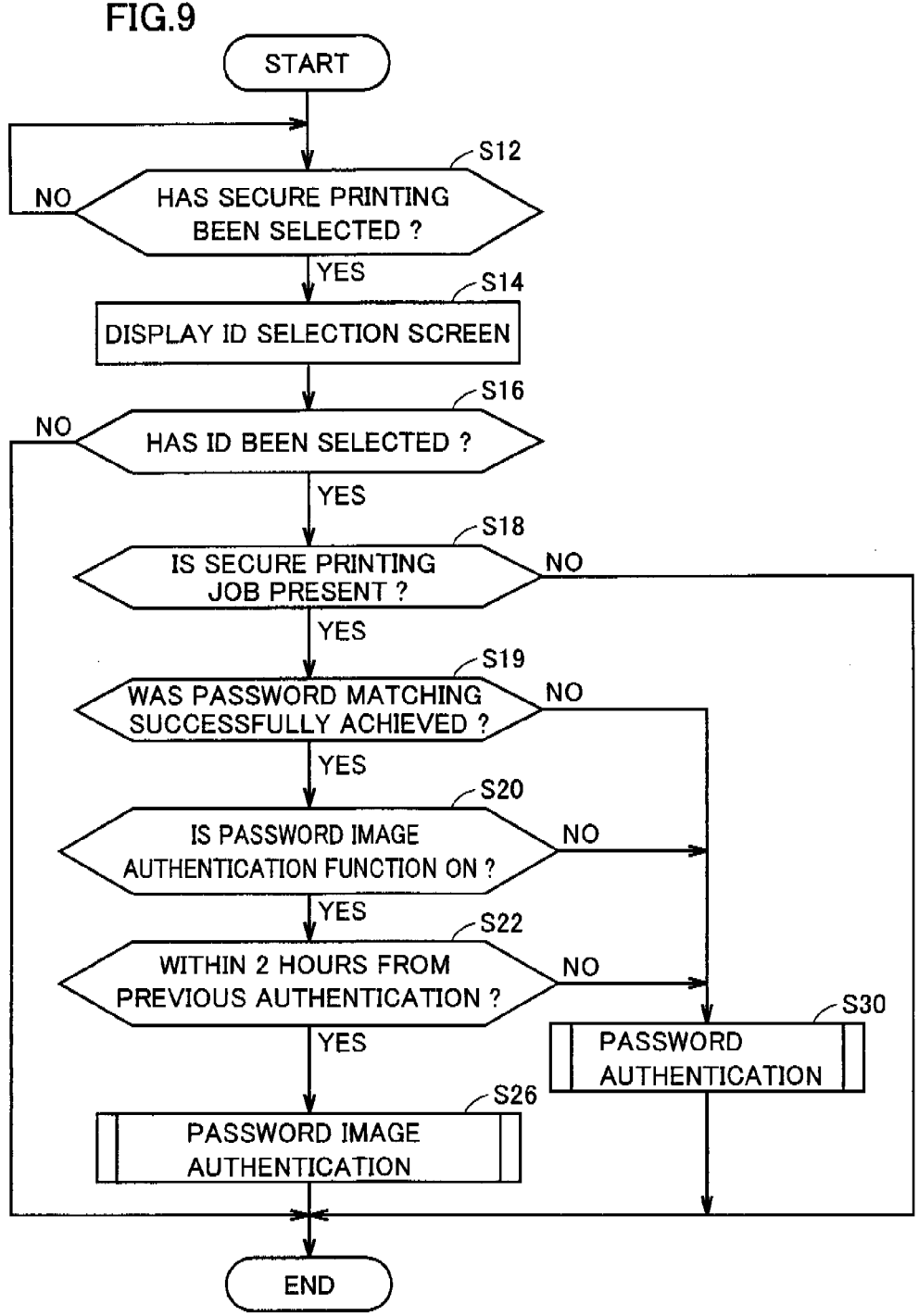
FIG. 9 is a flowchart illustrating secure printing processing in MFP 20 according to the first embodiment of the present invention.

Referring to FIG. 9, initially, CPU 10 determines whether secure printing has been selected or not. Whether or not secure printing has been selected by performing a prescribed operation of a not-shown operation key provided in control panel 19 is determined (step S12).

Then, when it is determined that secure printing has been selected (YES in step S12), an ID selection screen is displayed (step S14). Specifically, authentication method selection unit 30 described with reference to FIG. 7 reads the authentication table stored in authentication data storage unit 36 and causes the registered ID(s) to be displayed on control panel 19 as the ID selection screen.

Figure 10:
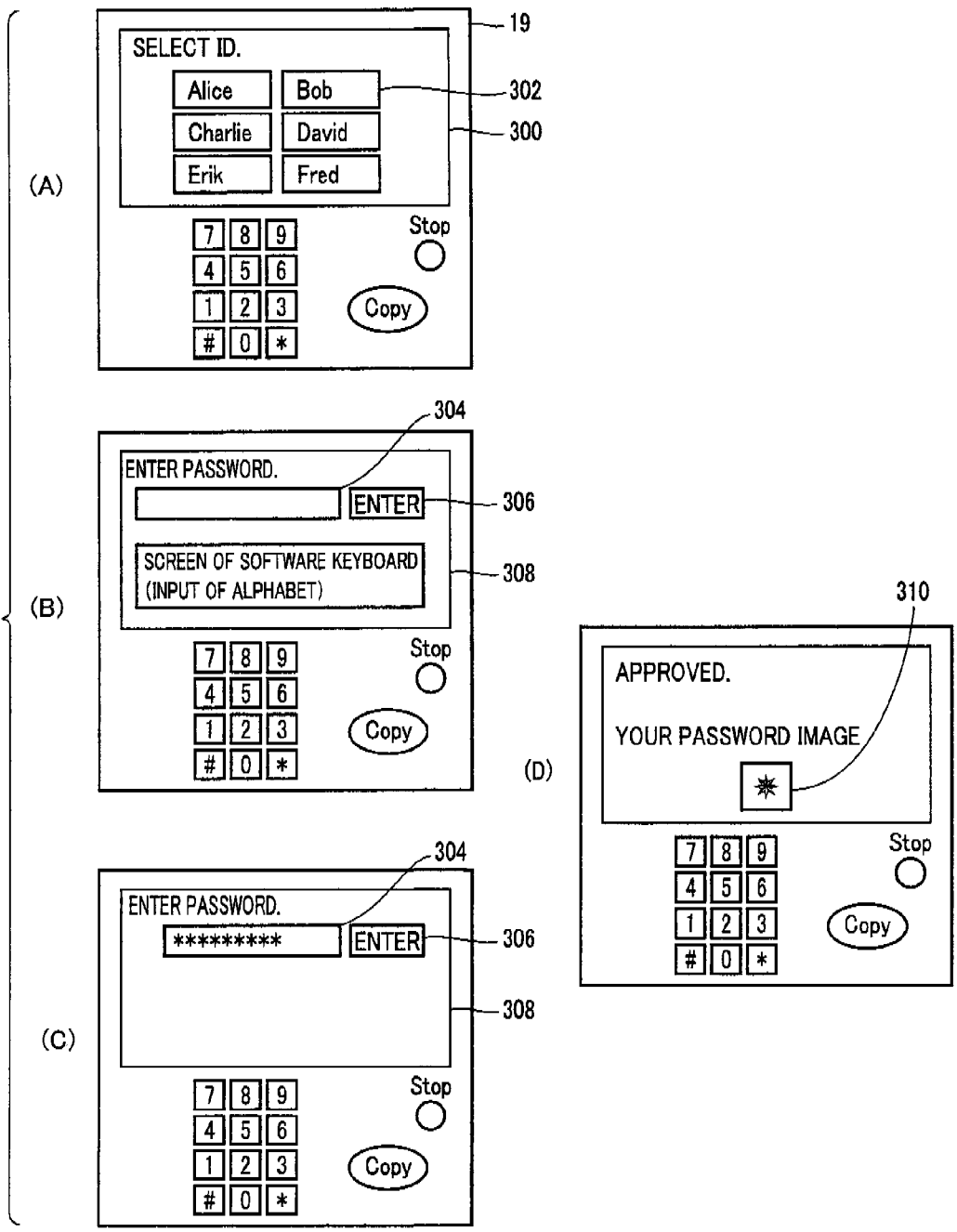
FIG. 10 is a diagram illustrating an exemplary processing screen in secure printing according to the first embodiment of the present invention.

An exemplary processing screen in secure printing according to the first embodiment of the present invention will be described with reference to FIG. 10.

FIG. 10(A) is a diagram illustrating an exemplary ID selection screen 300 according to the first embodiment of the present invention.

Referring to FIG. 10(A), here, a case where six registered IDs are displayed is shown. The user designates an item corresponding to his/her own ID (the user name in the present embodiment) through a touch panel.

Here, a case where an item 302 of the registered ID displayed as "Bob" representing the user name is provided is shown by way of example, and a case where "Bob" is designated will be described in the present embodiment.

Referring again to FIG. 9, thereafter, whether an ID has been selected or not is determined (step S16). Specifically, authentication method selection unit 30 determines whether or not an item corresponding to an ID has been designated in the ID selection screen described above.

Thereafter, when it is determined that an ID has been selected (YES in step S16), whether a secure printing job is present or not is determined (step S18). Specifically, authentication method selection unit 30 determines whether a secure printing job corresponding the designated ID stored in RAM 8 has been received or not.

Then, when authentication method selection unit 30 determines that a secure printing job is present (YES in step S18), authentication method selection unit 30 thereafter determines whether password matching is successfully achieved or not (step S19). Specifically, whether or not a password set as authentication information in the secure printing job matches with a password in the authentication table stored in authentication data storage unit 36 corresponding to the user ID selected as above is determined.

Then, when it is determined that the passwords match with each other (YES in step S19), whether or not the password image authentication function is ON or not is then determined (step S20). Specifically, authentication method selection unit 30 checks a flag indicating ON or OFF of the password image authentication function of the corresponding ID in the authentication table.

Then, when it is determined that the password image authentication function is ON (YES in step S20), whether the current time is within two hours from previous authentication or not is determined (step S22). Specifically, authentication method selection unit 30 determines whether the current time is within two hours from previous authentication or not based on comparison with the current time, by referring to the authentication time of the corresponding ID in the authentication table.

Then, when it is determined that the current time is within two hours from previous authentication (YES in step S22), password image authentication is carried out (step S26). Specifically, authentication method selection unit 30 instructs password image authentication unit 34 to carry out password image authentication. Password image authentication will be described later.

Meanwhile, when it is determined that an ID has not been selected (NO in step S16), the process ends (end). For example, when a Stop button or the like is pressed, the secure printing processing ends.

Meanwhile, when it is determined in step S18 that a secure printing job is not present for the selected ID (NO in step S18) as well, the process ends.

Meanwhile, when the passwords do not match with each other in step S19 (NO in step S19), the process proceeds to step S30.

When it is determined in step S20 that the password image authentication function is not ON, that is, it is OFF (NO in step S20), the process proceeds to step S30.

Meanwhile, when it is determined in step S22 that the current time is not within two hours from previous authentication (NO in step S22), the process proceeds to step S30. As a result of such processing, a validity period of a password image can be set to two hours and security can be ensured. Though the validity period is set to two hours by way of example in the present embodiment, the validity period is not particularly limited thereto and any period can be set in consideration of security. In addition, whether authentication is carried out within the same one day or not can also be determined, and determination based on whether or not a prescribed condition is satisfied with a past authentication time serving as history may be made.

Password authentication processing in step S30 will be described with reference to FIG. 11.

Figure 11:
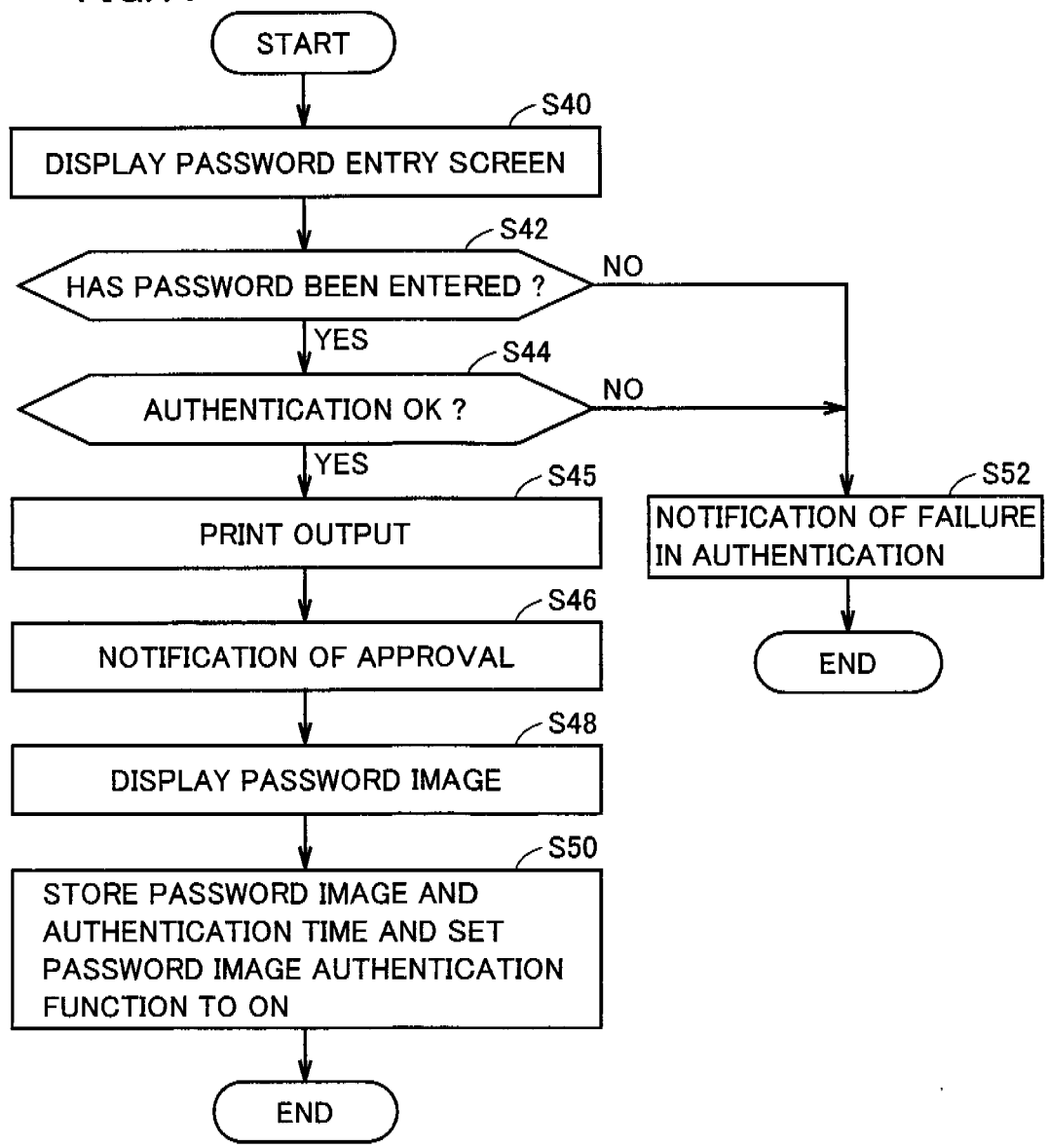
FIG. 11 is a flowchart illustrating password authentication processing in step S30.

Referring to FIG. 11, initially, a password entry screen is displayed (step S40). Specifically, password authentication unit 32 causes control panel 19 to display a password entry screen in response to an instruction from authentication method selection unit 30.

FIG. 10(B) is a diagram illustrating an exemplary password entry screen 308 according to the first embodiment of the present invention.

Referring to FIG. 10(B), here, a case where an indication to enter password is shown and an input field 304 for entry of a password using a screen of a software keyboard is provided is shown. The user enters a password registered by the user himself/herself in input field 304, by using the screen of the software keyboard.

FIG. 10(C) shows a case where a password was entered in input field 304 by using the screen of the software keyboard.

Then, an enter button 306 is pressed. Password authentication processing is thus started.

Referring again to FIG. 11, thereafter, whether a password has been entered or not is determined (step S42). Specifically, password authentication unit 32 makes determination based on whether or not a password was entered in input field 304 and enter button 306 was pressed in password entry screen 308 above.

Then, when it is determined that a password was entered (YES in step S42), whether authentication is OK or not is thereafter determined (step S44). Specifically, password authentication unit 32 determines whether the password entered in input field 304 matches with the password registered in the authentication table or not. Then, when the passwords match with each other, authentication is determined as OK.

When authentication is determined as OK (YES in step S44), print output is carried out (step S45). Specifically, the secure printing job is carried out and image data included in the job is developed in printer 18 and printed on a sheet of paper.

Then, notification of approval is given (step S46). Specifically, password authentication unit 32 notifies CPU 10 of approval.

Thereafter, a password image is displayed (step S48). Password authentication unit 32 instructs password image setting unit 38 to set a password image. Password image setting unit 38 sets any one password image among a plurality of password images and outputs the password image to password authentication unit 32. Then, password authentication unit 32 causes control panel 19 to display the password image set by password image setting unit 38. It is noted that display of a password image may be turned off after display for a prescribed period of time, such as approximately one second, or it may be turned off at any timing desired by the user.

A case where a password image according to the first embodiment of the present invention is displayed will be described with reference to FIG. 10(D).

Referring to FIG. 10(D), here, a case where an indication as "approved" is given and image object 310 is displayed under the indication "your password image" is shown. The image object is registered as an authentication key to be used in password image authentication which will be described later.

Referring again to FIG. 11, thereafter, the password image and the authentication time are stored and password image authentication function is set to ON (step S50). Specifically, password authentication unit 32 has the displayed image object registered as the password image, has the time of approval registered as the authentication time, and has the password image authentication function registered as ON, in the item fields of the corresponding ID in the authentication table of authentication data storage unit 36. Then, the process ends (end).

Meanwhile, when it is determined in step S42 that a password was not entered (NO in step S42), notification that authentication failed is given (step S52).

Meanwhile, when authentication was NG in step S44 as well (NO in step S44), notification that authentication failed is given (step S52). Specifically, password authentication unit 32 notifies CPU 10 of failure in authentication. As a result of this processing, CPU 10 can ensure security by prohibiting use of a function of MFP 20 by the user who failed in authentication.

Then, the process ends (end).

FIG. 12 is a diagram illustrating a flow of processing in registration in the authentication table according to the first embodiment of the present invention when password authentication processing is performed.

Referring to FIG. 12(A), here, a case where a password "Ow8gcA", a password image "none", ON or OFF of password image authentication function "OFF", and an authentication time "08/12/14 17:03:15" are registered in correspondence with the user ID "Alice" is shown.

Referring to FIG. 12(B), then, a case where a password "wQ9DspX", a password image "YES (image object 310 in FIG. 10)", ON or OFF of password authentication function "ON", and an authentication time "09/1/7 11:20:34" are registered in correspondence with the user ID "Bob" is shown.

Image authentication processing which will be described later is performed in accordance with this registration processing. In the present embodiment, a case where a secure printing job is received a plurality of times is assumed.

A flow of password image authentication processing will be described with reference to FIG. 13.

Figure 13:
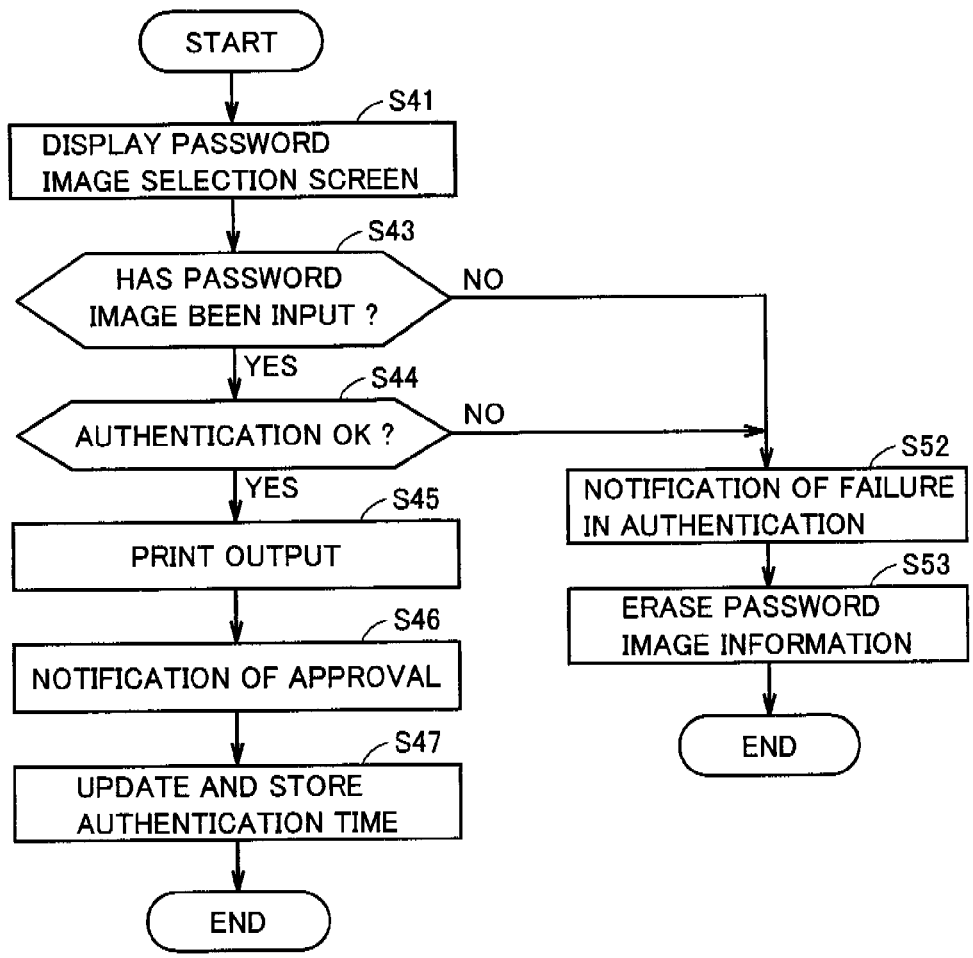
FIG. 13 is a flowchart illustrating a flow of password image authentication processing.

Referring to FIG. 13, initially, a password image selection screen is displayed (step S41). Specifically, password image authentication unit 34 causes control panel 19 to display a password image selection screen in response to an instruction from authentication method selection unit 30.

Figure 14:
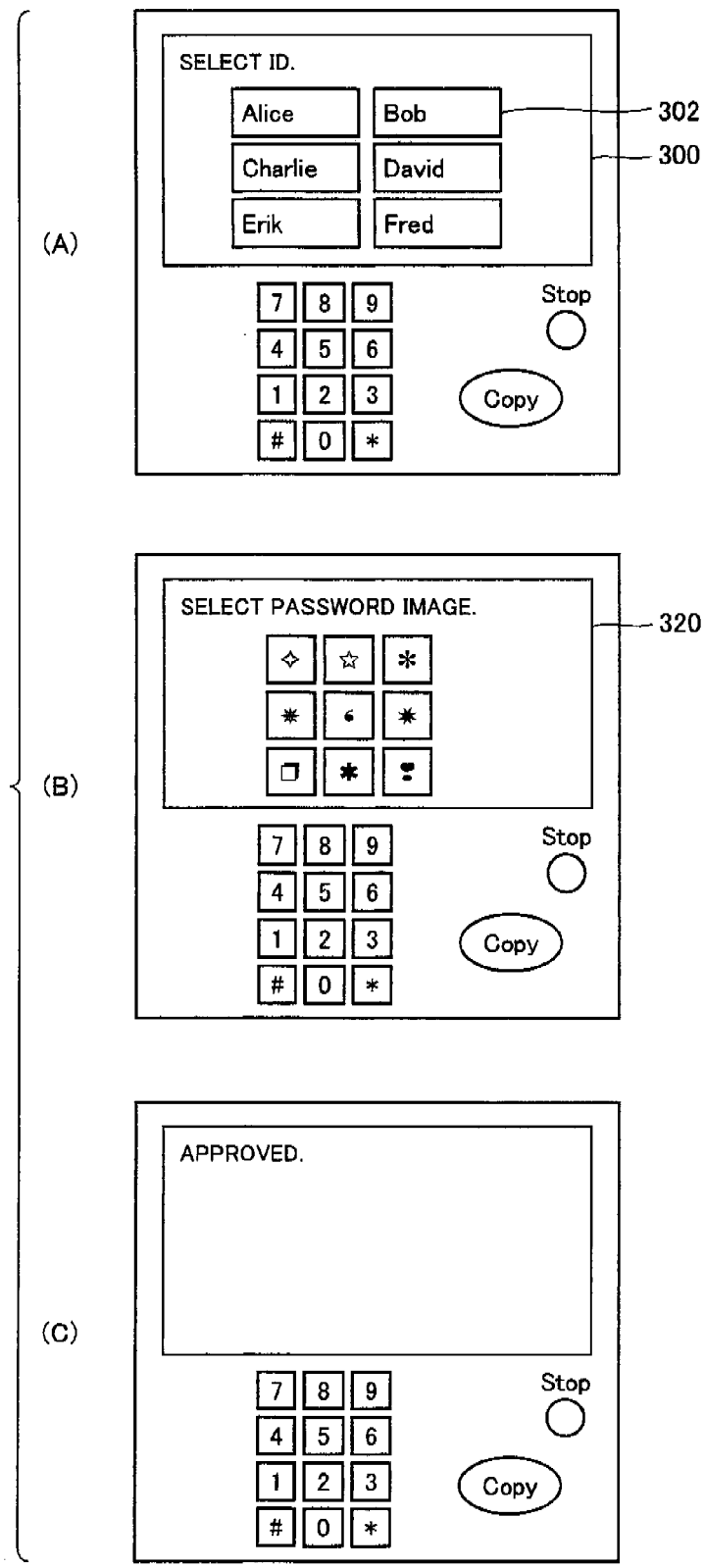
FIG. 14 is a diagram illustrating a screen for password image authentication processing according to the first embodiment of the present invention.

A screen for password image authentication processing according to the first embodiment of the present invention will be described with reference to FIG. 14.

FIG. 14(A) shows exemplary ID selection screen 300 according to the first embodiment of the present invention, as in FIG. 10(A) above.

Referring to FIG. 14(A), here, a case where six registered IDs are displayed as described above is shown. The user designates an item corresponding to his/her own ID (the user name in the present embodiment) through a touch panel.

A case where item 302 of the registered ID displayed as "Bob" representing the user name is provided is shown by way of example, and a case where "Bob" is designated will be described in the present embodiment.

FIG. 14(B) is a diagram illustrating an exemplary password image selection screen 320 according to the first embodiment of the present invention.

Referring to FIG. 14(B), here, a plurality of image objects are displayed, and the user is invited to input his/her own password image that has been registered, from among the image objects. Then, the user inputs his/her own registered password image through the touch panel.

Then, as a result of input of the password image, password image authentication processing is started.

Referring again to FIG. 13, thereafter, whether a password image has been input or not is determined (step S43). Specifically, password image authentication unit 34 makes determination based on whether or not a password image has been input in password image selection screen 320 described above.

Then, when it is determined that a password image has been input (YES in step S43), whether authentication is OK or not is thereafter determined (step S44). Specifically, password image authentication unit 34 determines whether or not the input password image matches with the password image registered in the authentication table. Then, when the password images match with each other, authentication is determined as OK.

When authentication is determined as OK (YES in step S44), print output is carried out (step S45). Specifically, the secure printing job is carried out and image data included in the job is developed in printer 18 and printed on a sheet of paper.

Then, notification of approval is given (step S46). Specifically, password authentication unit 32 notifies CPU 10 of approval.

FIG. 14(C) is a diagram showing a case where authentication of a password image was successful.

Referring to FIG. 14(C), here, an indication as "approved" is shown.

With such an indication, the user is notified of approval.

According to such a configuration, security is ensured by password authentication processing, and in authentication for the second time, authentication can be carried out in a simplified manner by carrying out password image authentication, which contributes to user's convenience.

It is noted that a plurality of image objects displayed together with the registered password image above are provided in advance, however, any image object may be used. Alternatively, an image object is not limited to those provided in advance, and it may be obtained by downloading or through external registration by the user.

Referring again to FIG. 13, thereafter, the authentication time is updated and stored (step S47). Specifically, password image authentication unit 34 has the time of approval registered as the authentication time in the item field of the corresponding ID in the authentication table. Namely, the authentication time is updated. Then, the process ends (end). By updating the authentication time, the validity period of the password image can be re-started.

Meanwhile, when it is determined in step S44 that authentication was NG as well (NO in step S44), notification that authentication failed is given (step S52). Specifically, password image authentication unit 34 notifies CPU 10 of failure in authentication. As a result of this processing, CPU 10 can ensure security by prohibiting use of a function of MFP 20 by the user who failed in authentication.

Thereafter, password image information is erased (step S53). Specifically, password image authentication unit 34 instructs authentication data storage unit 36 to erase password image information. Since password image authentication is a simplified authentication processing scheme, if a password image is valid even after failure in authentication, a malicious third party may find out the password image.

FIG. 15 is a diagram illustrating a flow of processing in registration in the authentication table according to the first embodiment of the present invention when password image authentication processing is performed.

Referring to FIG. 15(A), here, a case where a password "OwSgcA", a password image "none", ON or OFF of password image authentication function "OFF", and an authentication time "08/12/14 17:03:15" are registered in correspondence with the user ID "Alice" is shown. In addition, a case where a password "wQ9DspX", a password image "YES (image object 310 in FIG. 10)", ON or OFF of password authentication function "ON", and an authentication time "09/1/7 11:20:34" are registered in correspondence with the user ID "Bob" is shown.

A case where password image authentication processing is performed for this user ID "Bob" will be described.

Referring to FIG. 15(B), here, a case where information in the authentication table is updated when authentication was OK is shown.

FIG. 15(B) is different from FIG. 15(A) in that the authentication time is registered as "09/1/7 11:35:14" in correspondence with the user ID "Bob", but it is otherwise the same.

Referring to FIG. 15(C), here, a case where information in the authentication table is updated when authentication was NG is shown. Specifically, a case where the password image corresponding to the user ID "Bob" has been erased, the flag indicating ON or OFF of the password image authentication function has been set to OFF, and the authentication time has been erased is shown.

As a result of this processing, when authentication processing is performed again, only password authentication is valid and thus security can be enhanced by this processing.

In connection with the flowchart in FIG. 13 above, a case that, in the event of failure in authentication of a password image or the like, CPU 10 is notified of failure in authentication and password image information is erased has been described. Meanwhile, a rightful user may forget the registered password image and fail in authentication. In such a case, password authentication can also be carried out again.

A variation of authentication processing in MFP 20 according to the first embodiment of the present invention will be described with reference to FIG. 16.

Figure 16:
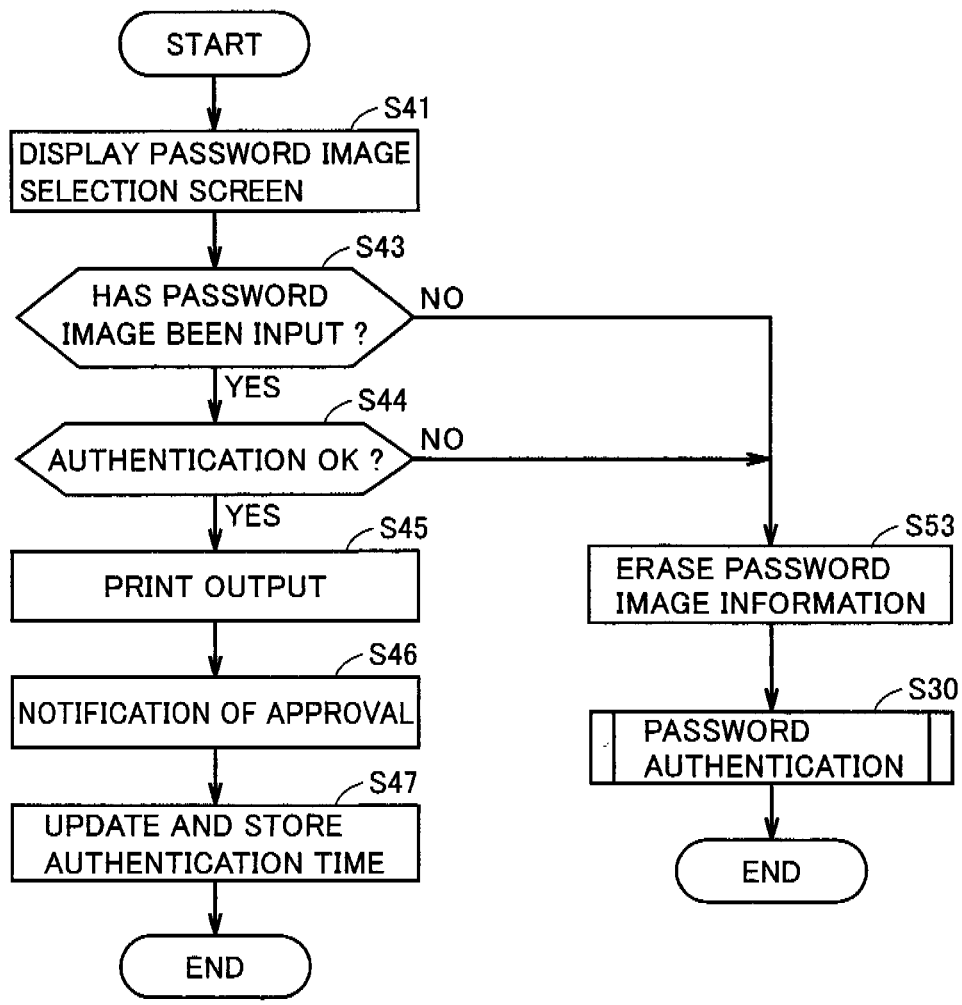
FIG. 16 is a flowchart illustrating a variation of authentication processing in MFP 20 according to the first embodiment of the present invention.

Referring to FIG. 16, FIG. 16 is different from the flowchart in FIG. 13 in performing steps S30 and S53 instead of steps S52 and S53.

Specifically, when a password image was not input in step S43 or when authentication was NG in step S44, password image information is erased (step S53). Specifically, password image authentication unit 34 instructs authentication data storage unit 36 to erase password image information. Since password image authentication is a simplified authentication processing scheme, if a password image is valid even after failure in authentication, a malicious third party may find out the password image.

Thereafter, password authentication is carried out (step S30). Then, the process ends.

Password authentication is the same as described with reference to the flowchart in FIG. 11. Here, when password authentication is successful, a new password image can be registered by setting and registering the password image again, which contributes to user's convenience.

In addition, a case where password image setting unit 38 sets any one password image from among a plurality of images has been described above, however, the user may set a password image based on his/her intention.

Figure 17:
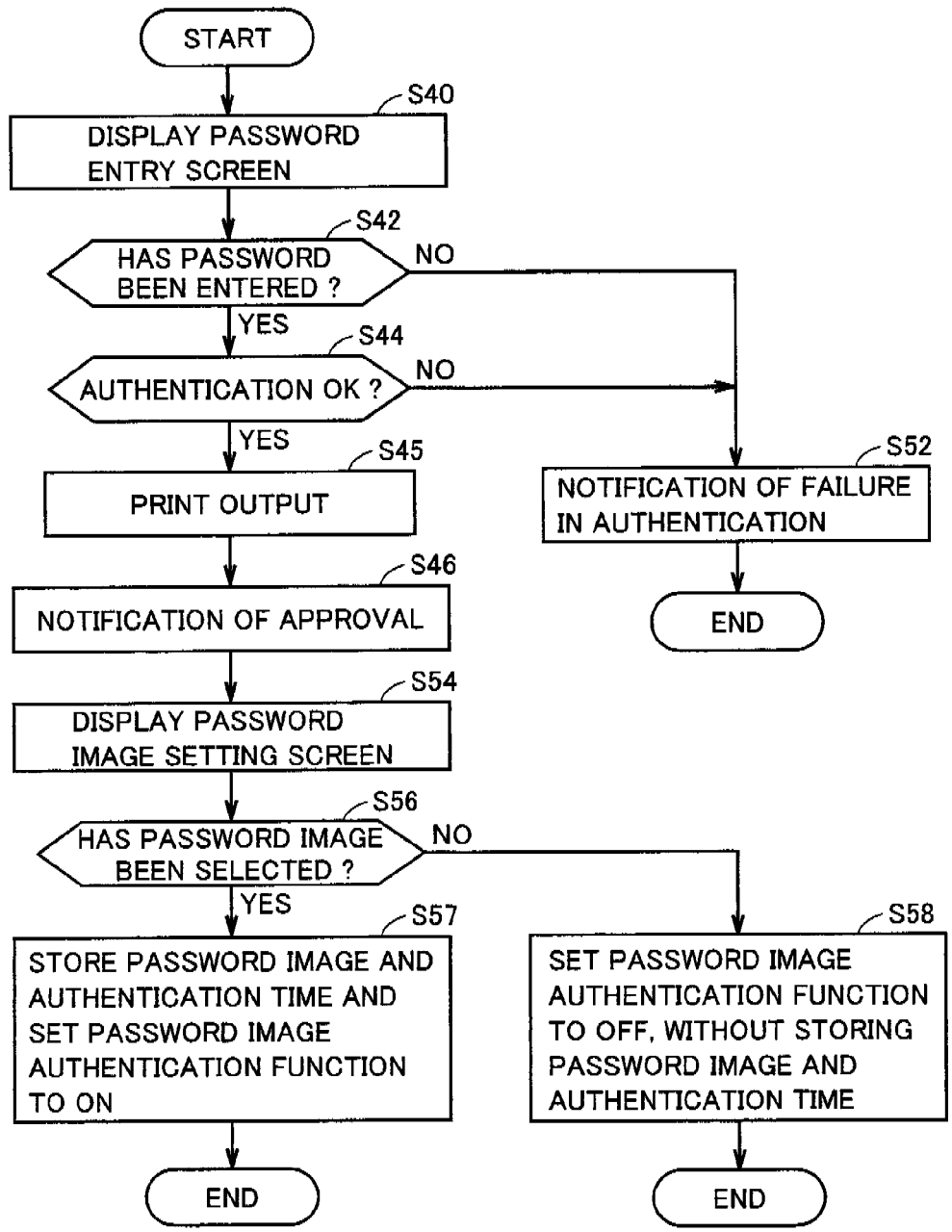
FIG. 17 is a flowchart illustrating a variation of password authentication processing in MFP 20 according to the first embodiment of the present invention.

FIG. 17 illustrates a variation of password authentication processing in MFP 20 according to the first embodiment of the present invention.

Referring to FIG. 17, FIG. 17 is different from the flowchart in FIG. 11 in processing in step S46 and subsequent steps. Specifically, after authentication was successful, a password image setting screen is then displayed (step S54). Password authentication unit 32 requires password image setting unit 38 of a plurality of password images that can be set. Password image setting unit 38 outputs a plurality of password images that can be set to password authentication unit 32. Then, password authentication unit 32 causes control panel 19 to display the plurality of password images that can be set, output from password image setting unit 38.

Then, whether a password image has been selected or not is determined (step S56). Specifically, password authentication unit 32 determines whether or not a user's instruction to input a password image has been given in the password image setting screen.

Then, when a password image has been selected (YES in step S56), the selected password image and the authentication time are stored and the password image authentication function is set to ON (step S57). Specifically, password authentication unit 32 has the selected image object registered as the password image, has the time of approval registered as the authentication time, and has the password image authentication function registered as ON, in the item fields of the corresponding ID in the authentication table of authentication data storage unit 36. Then, the process ends (end).

Meanwhile, when a password image was not selected (NO in step S56), password authentication unit 32 does not have a password image and an authentication time stored in the authentication table of authentication data storage unit 36 and sets the password image authentication function to OFF (step S58).

Figure 18:
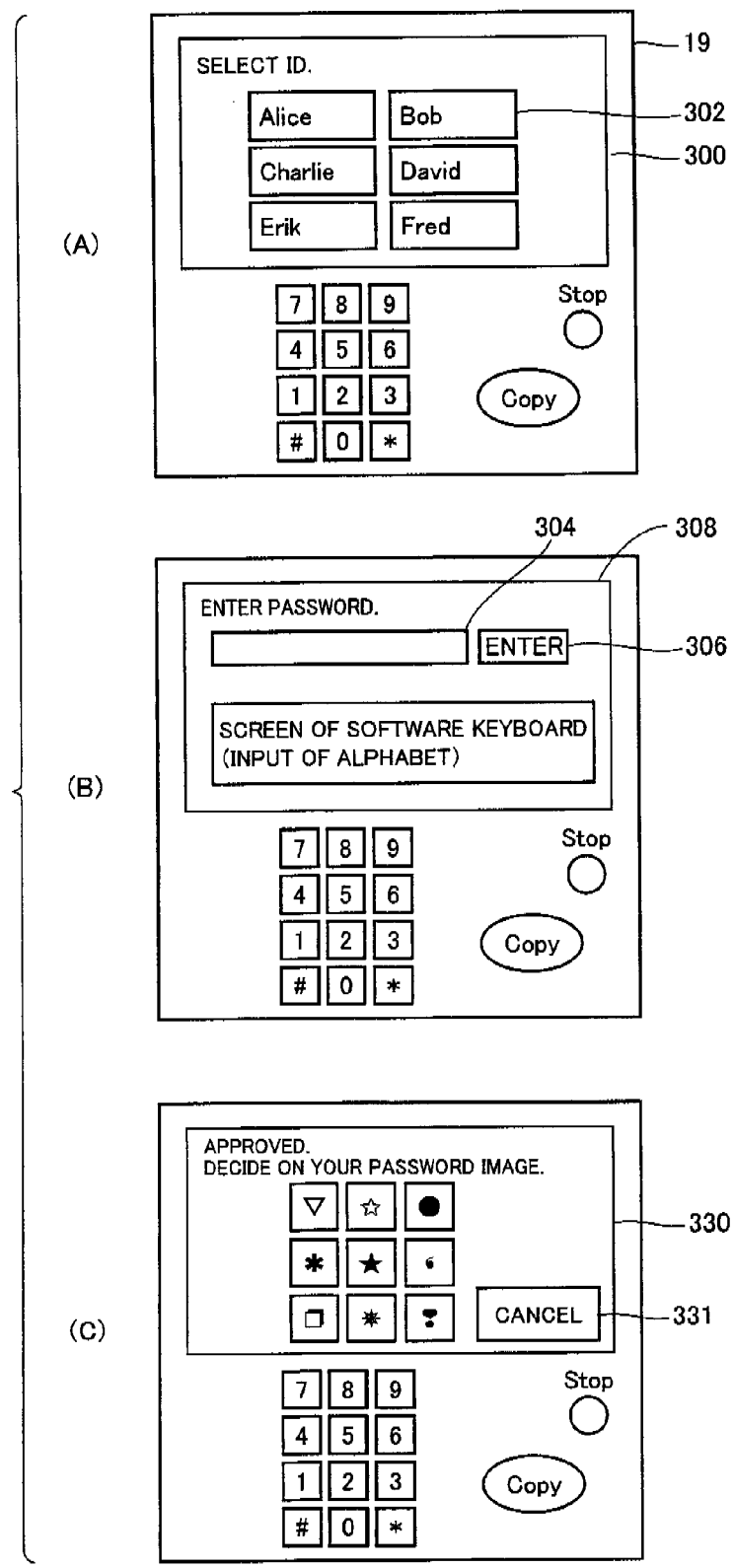
FIG. 18 is a diagram illustrating a screen for password image authentication processing according to a variation of the first embodiment of the present invention.

A screen for password image authentication processing according to the variation of the first embodiment of the present invention will be described with reference to FIG. 18.

Referring to FIG. 18(A), here, a case where six registered IDs are displayed as described above is shown. The user designates an item corresponding to his/her own ID (the user name in the present embodiment) through a touch panel.

A case where item 302 of the registered ID displayed as "Bob" representing the user name is provided is shown by way of example, and a case where "Bob" is designated will be described in the present embodiment.

Referring to FIG. 18(B), this is a diagram illustrating exemplary password entry screen 308 as described above. Here, a case where an indication to enter password is shown and input field 304 for entry of a password using a screen of a software keyboard is provided is shown. The user enters a password registered by the user himself/herself in input field 304, by using the screen of the software keyboard. Then, the password is entered in input field 304 with the use of the screen of the software keyboard and enter button 306 is pressed. Password authentication processing is thus started.

Referring to FIG. 18(C), here, a case where an indication that "Approved. Decide on your password image." is shown and a plurality of object images that can be registered are displayed is shown.

The user can decide on a password image based on his/her intention, from among the object images.

Then, the image object decided (designated) as the password image is registered as an authentication key to be used in password image authentication which will be described later.

According to such a configuration, since the user can decide on any password image, a user's preferred image can be set and convenience is improved.

Here, by selecting a "cancel" button 331, password authentication unit 32 does not have a password image and an authentication time stored in the authentication table of authentication data storage unit 36 and sets the password image authentication function to OFF. According to this configuration, when the user does not wish to use a password image, he/she can set that function to OFF, which contributes to improvement in user's convenience.

It is noted that the password image authentication function can also be set to OFF by providing "cancel" button 331 and selecting that button also in FIG. 10(D).

Though a case where a password image is presented after password authentication was successful has been described in the present embodiment, a password image may also be presented prior to password authentication, for example, at the time of setting of a password. In this case, authentication using a password image should only be validated at the time when password authentication was successful.

[Second Embodiment]

A case where password image authentication is carried out in executing a secure printing job in MFP 20 has been described above.

On the other hand, similar password image authentication can be carried out also in a PC.

A schematic block diagram of a PC 110 according to a second embodiment of the present invention will be described with reference to FIG. 19.

Figure 19:
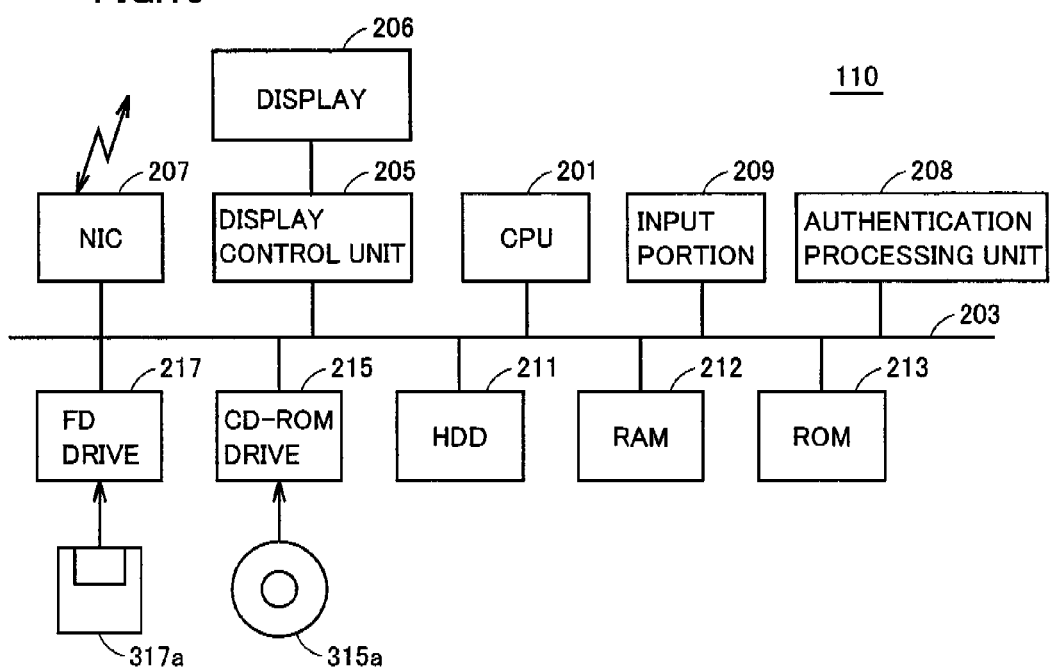
FIG. 19 is a diagram illustrating a schematic block diagram of a PC 110 according to a second embodiment of the present invention.

Referring to FIG. 19, PC 110 according to the embodiment of the present invention is substantially the same as PC 100 described with reference to FIG. 3, however, it is different in further including an authentication processing unit 208. Since the PC is otherwise the same, detailed description thereof will not be repeated.

It is noted that an OS (Operating System) (for example, Windows®) for performing basic functions in PC 110 is stored in ROM 213 or HDD 211 in the present embodiment and a software program for performing various types of processing is executed by starting up the OS stored in ROM 213 or HDD 211. In addition, a software program having what is called a screen saver function for protecting a screen while an input operation is not performed for a certain period of time is stored in ROM 213 or HDD 211 and a security function is provided as an additional function of the screen saver. Specifically, in returning from the screen saver function, authentication processing by authentication processing unit 208 is performed.

PC 110 according to the second embodiment of the present invention performs authentication processing at the time of turn-on of power for boot-up and at the time of returning from the screen saver function.

An authentication scheme in PC 110 highly convenient for the user will be described hereinafter in the second embodiment of the present invention.

Briefly speaking, in authentication for the first time, password authentication is carried out, and subsequently, any of password image authentication and password authentication is carried out.

A functional block in authentication processing unit 208 according to the second embodiment of the present invention will be described with reference to FIG. 20.

Figure 20:
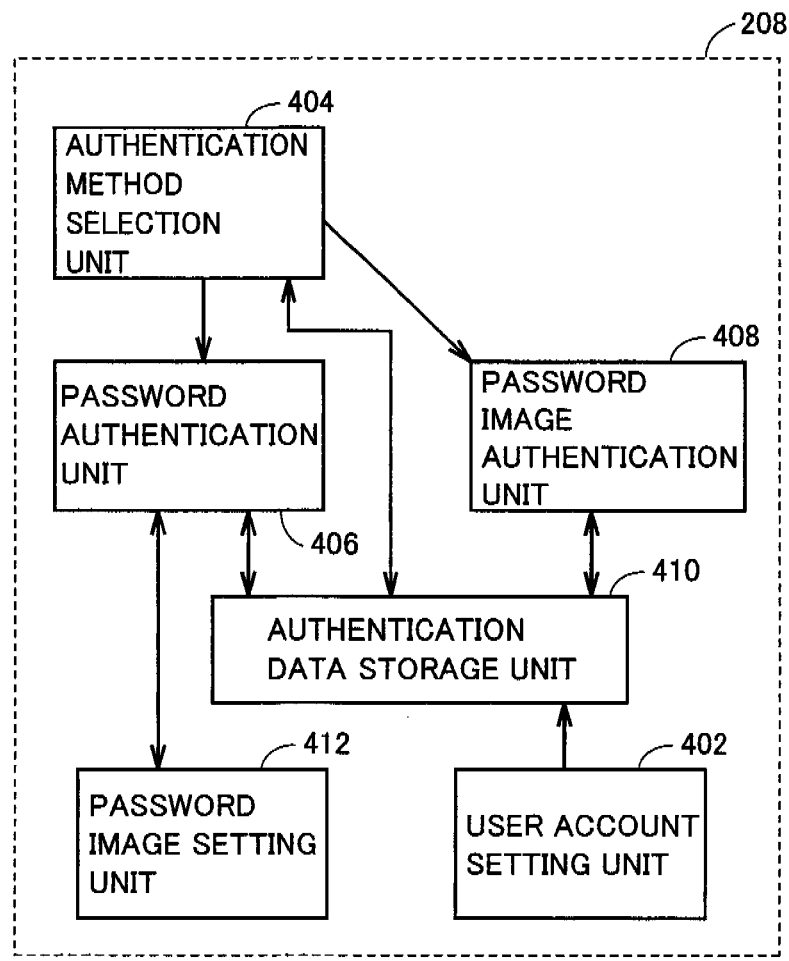
FIG. 20 is a diagram illustrating a functional block in an authentication processing unit 208 according to the second embodiment of the present invention.

Referring to FIG. 20, authentication processing unit 208 includes a user account setting unit 402, an authentication method selection unit 404, a password authentication unit 406, a password image authentication unit 408, an authentication data storage unit 410, and a password image setting unit 412.

User account setting unit 402 performs processing for setting a user account.

Authentication method selection unit 404 selects between authentication processing using password authentication unit 406 and authentication processing using password image authentication unit 408.

Password authentication unit 406 carries out password authentication in accordance with a user's input instruction.

Password image authentication unit 408 carries out image authentication in accordance with a user's input instruction.

Authentication data storage unit 410 has an authentication table in which authentication data to be used for authentication is stored.

Though the description will be given later, password image setting unit 412 sets an image to be used in password image authentication unit 408.

Initially, processing for setting a user account for registration of authentication information will be described.

Processing for setting a user account according to the second embodiment of the present invention will be described with reference to FIG. 21.

Figure 21:
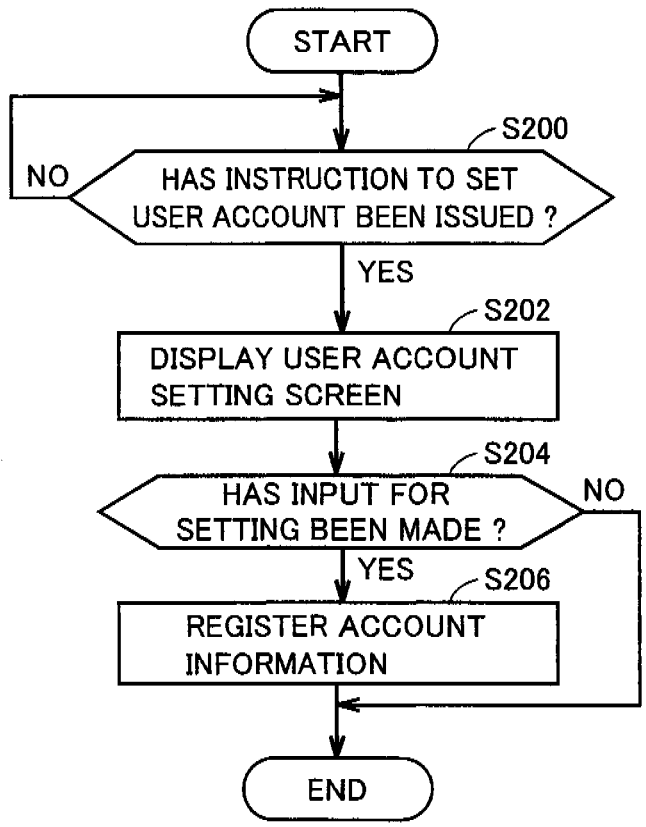
FIG. 21 is a flowchart illustrating processing for setting a user account according to the second embodiment of the present invention.

Referring to FIG. 21, whether an instruction to set a user account has been issued or not is determined (S200).

Specifically, CPU 201 determines whether or not start-up of a user account setting program for registration of a user who uses PC 110 has been indicated in response to an input instruction through input portion 209 such as a mouse representing a pointing device. The user account setting program is stored, for example, in ROM 213 and started up in response to a prescribed instruction. For example, the program may be started up by designation of an icon provided in display 206.

When CPU 201 determines that an instruction to set a user account has been issued (YES in step S200), authentication processing unit 208 is started up. Then, user account setting unit 402 has a user account setting screen displayed (step S202).

A user account setting screen 500 will be described with reference to FIG. 22.

Figure 22:
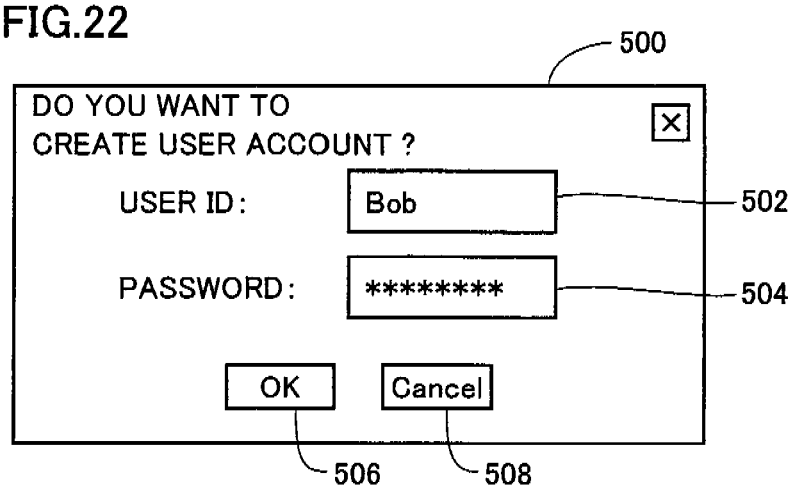
FIG. 22 is a diagram illustrating a user account setting screen 500.

Referring to FIG. 22, here, a case where input fields 502 and 504 for entering a user ID and a password to be registered are provided in user account setting screen 500 is shown.

A user ID can be entered in input field 502 by using a keyboard or the like, and a password can be entered in input field 504 by using a keyboard or the like.

Here, in a lower region of user account setting screen 500, an "OK" item button 506 is provided. As the user designates OK button 506 by using a mouse or the like representing a pointing device, a user ID and a password representing account information can be set.

On the other hand, by designating a "Cancel" button 508, user account setting processing can end.

Referring again to FIG. 21, whether input for setting has been made or not is determined (step S204). Specifically, user account setting unit 402 determines whether or not a user ID and a password were entered and "OK" button 506 was pressed in the user account setting screen.

When it is determined in step S204 that input for setting has been made (YES in step S204), account information is registered (step S206). Specifically, user account setting unit 402 has the user ID and the password representing the account information registered in the authentication table of authentication data storage unit 410.

Then, the process ends (end).

Meanwhile, when it is determined in step S204 that input for setting was not made (NO in step S204), account information setting processing ends (end).

In the present embodiment, description will be given assuming that the user ID and the password are set in the user account setting screen above.

The authentication table stored in authentication data storage unit 410 is substantially the same as that described with reference to FIG. 8, however, an item of ON or OFF of the password image authentication function is not provided. Items of a user ID, a password, a password image, and an authentication time are provided. Since the authentication table is otherwise the same, detailed description thereof will not be repeated.

Authentication processing in PC 110 according to the second embodiment of the present invention will be described with reference to FIG. 23.

Figure 23:
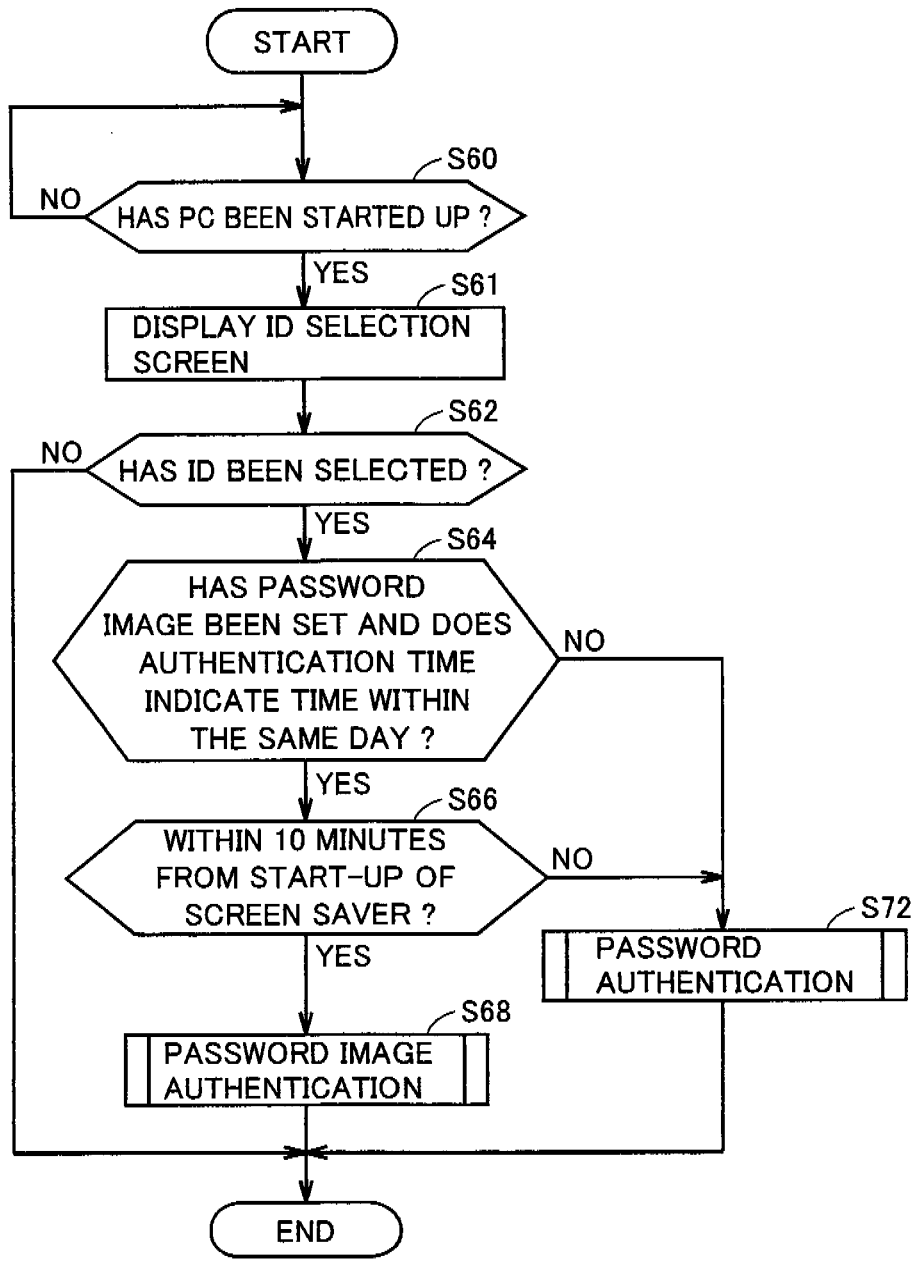
FIG. 23 is a flowchart illustrating authentication processing in PC 110 according to the second embodiment of the present invention.

Referring to FIG. 23, initially, whether the PC has been started up or not is determined (step S60). Specifically, determination that the PC has been started up is made when power is turned on by using a not-shown power button. In addition, start-up of the PC includes returning from the screen saver after start-up thereof in the absence of an operation of PC 110 for a certain period of time.

When the PC is started up, CPU 201 starts up authentication processing unit 208 in PC 110 and performs authentication processing.

Thereafter, an ID selection screen is displayed (step S61). Specifically, authentication method selection unit 404 described with reference to FIG. 20 reads the authentication table stored in authentication data storage unit 410 and causes the registered ID(s) to be displayed on display 206 as the ID selection screen under the control of display control unit 205.

Figure 24:
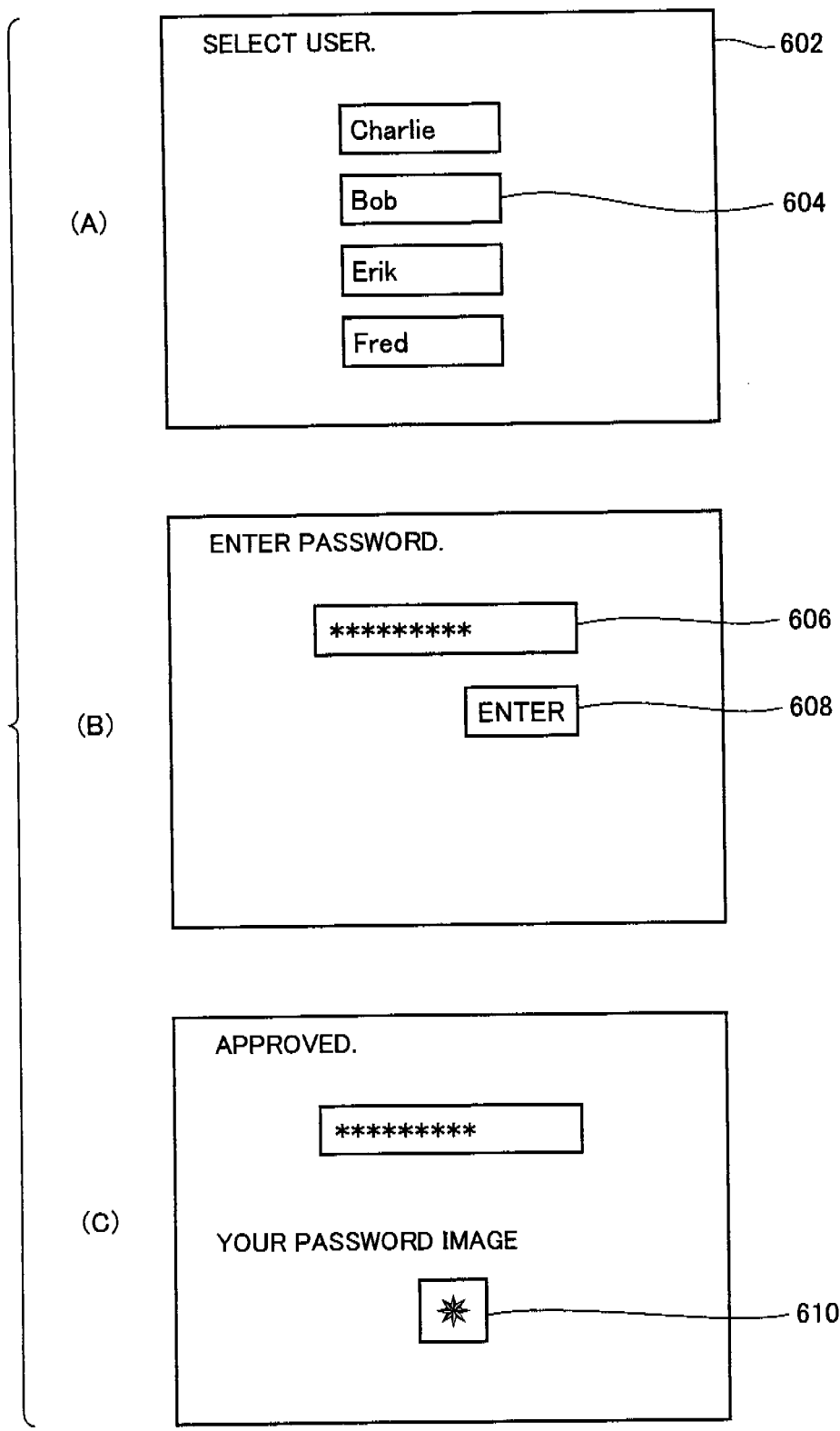
FIG. 24 is a diagram illustrating an exemplary screen for authentication processing according to the second embodiment of the present invention.

An exemplary screen for authentication processing according to the second embodiment of the present invention will be described with reference to FIG. 24.

FIG. 24(A) is a diagram illustrating an exemplary ID selection screen 602 according to the second embodiment of the present invention.

Referring to FIG. 24(A), here, a case where four registered IDs are displayed is shown. The user designates an item corresponding to his/her own ID (the user name in the present embodiment) using a mouse or the like representing a pointing device.

Here, a case where an item 604 of the registered ID displayed as "Bob" representing the user name is provided is shown by way of example, and a case where "Bob" is designated will be described in the present embodiment.

Referring again to FIG. 23, thereafter, whether an ID has been selected or not is determined (step S62). Specifically, authentication method selection unit 404 determines whether or not an item corresponding to an ID has been designated in the ID selection screen described above.

Thereafter, when it is determined that an ID has been selected (YES in step S62), whether or not a password image is set and the authentication time indicates a time within the same day (step S64). Specifically, authentication method selection unit 404 reads the authentication table stored in authentication data storage unit 410 and determines whether or not the authentication time indicates a time within the same day if the authentication time has been registered for the corresponding ID.

Then, when authentication method selection unit 404 determines that the password image is set and the authentication time indicates a time within the same day (YES in step S64), authentication method selection unit 404 thereafter determines whether the current time is within ten minutes from start-up of the screen saver or not (step S66). Specifically, authentication method selection unit 404 determines whether the current time is within ten minutes or not based on comparison between the time of start-up of the screen saver and the current time.

When it is determined in step S66 that the current time is within ten minutes from start-up of the screen saver (step S66), password image authentication is carried out (step S68). Specifically, authentication method selection unit 404 instructs password image authentication unit 408 to carry out password image authentication when the current time is within ten minutes from start-up of the screen saver. Password image authentication will be described later.

Meanwhile, when it is determined that an ID has not been selected (NO in step S62), the authentication processing ends (end). For example, though not shown, authentication processing ends when "cancel" or the like is pressed. In such a case, PC 110 is set to be unusable.

Meanwhile, when it is determined in step S64 that a password image is set but the authentication time does not indicate a time within the same day (NO in step S64), the process proceeds to step S72. Specifically, authentication method selection unit 404 instructs password authentication unit 406 to carry out password authentication. When the authentication time does not indicate a time within the same day, password authentication is carried out in order to ensure security. Password authentication will be described later.

Meanwhile, when it is determined in step S66 that the current time is not within ten minutes from start-up of the screen saver (NO in step S66), the process proceeds to step S72. Specifically, authentication method selection unit 404 instructs password authentication unit 406 to carry out password authentication. When the current time is not within ten minutes from start-up of the screen saver, password authentication is carried out in order to ensure security. For example, since the screen saver is not started up at the time of turn-on of power for boot-up, password authentication is carried out.

Password authentication processing in step 572 will be described with reference to FIG. 25.

Figure 25:
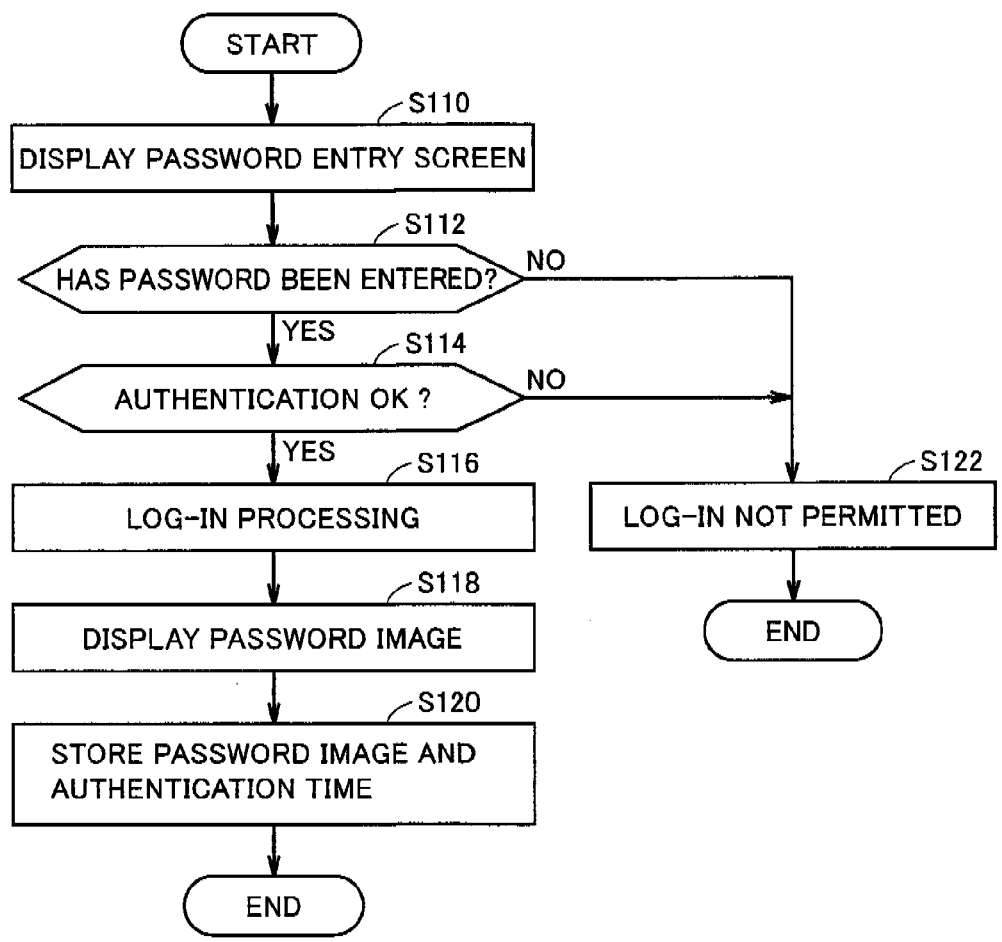
FIG. 25 is a flowchart illustrating password authentication processing in step S72.

Referring to FIG. 25, initially, a password entry screen is displayed (step S110). Specifically, password authentication unit 406 causes display 206 to display a password entry screen in response to an instruction from authentication method selection unit 404.

FIG. 24(B) is a diagram illustrating an exemplary password entry screen according to the second embodiment of the present invention.

Referring to FIG. 24(B), here, a case where an indication to enter password is shown and an input field 606 for entry of a password is provided is shown. The user enters a password registered by the user himself/herself in input field 606, by using a keyboard implementing input portion 209.

Then, an enter button 608 is pressed. Password authentication processing is thus started.

Referring again to FIG. 25, thereafter, whether a password has been entered or not is determined (step S112). Specifically, password authentication unit 406 makes determination based on whether or not a password was entered in input field 606 and enter button 608 was pressed in the aforementioned password entry screen.

Then, when it is determined that a password was entered (YES in step S112), whether authentication is OK or not is thereafter determined (step S114). Specifically, password authentication unit 406 determines whether the password entered in input field 606 matches with the password registered in the authentication table or not. Then, when the passwords match with each other, authentication is determined as OK.

When authentication is determined as OK (YES in step S114), log-in processing is thereafter performed (step S116). Specifically, password authentication unit 406 notifies CPU 10 of approval. PC 110 can thus be used. As described above, for example, when power is turned on for boot-up, the screen saver has not yet been started up and hence password authentication is carried out. Namely, when power is turned on for boot-up, security can be enhanced by having common password authentication carried out.

Thereafter, a password image is displayed (step S118). Password authentication unit 406 instructs password image setting unit 412 to set a password image. Password image setting unit 412 sets any one password image among a plurality of password images and outputs the password image to password authentication unit 406. Then, password authentication unit 406 causes display 206 to display the password image set by password image setting unit 412. It is noted that display of a password image may be turned off after display for a prescribed period of time, such as approximately one second, or it may be turned off at any timing desired by the user.

A case where a password image according to the second embodiment of the present invention is displayed will be described with reference to FIG. 24(C).

Referring to FIG. 24(C), here, a case where an indication as approved is shown and an image object 610 is displayed under the indication "your password image" is shown. The image object is registered as an authentication key to be used in password image authentication which will be described later.

Referring again to FIG. 25, thereafter, the password image and the authentication time are stored (step S120). Specifically, password authentication unit 406 has the displayed image object registered as the password image and has the time of approval registered as the authentication time, in the item fields of the corresponding ID in the authentication table of authentication data storage unit 410. Then, the process ends (end).

Meanwhile, when it is determined in step S114 that authentication was NG (NO in step S114), log-in is not permitted (step S122). As a result of this processing, security can be ensured by prohibiting use of a function of PC 110 by the user who failed in log-in.

FIG. 26 is a diagram illustrating a flow of processing in registration in the authentication table according to the second embodiment of the present invention when password authentication processing is performed.

Referring to FIG. 26(A), here, a case where a password "Ow8gcA", a password image "none", and an authentication time "08/12/14 17:03:15" are registered in correspondence with the user ID "Alice" is shown.

Referring to FIG. 26(B), then, a case where a password "wQ9DspX", a password image "YES (image object 610 in FIG. 24)", and an authentication time "09/1/7 11:20:34" are registered in correspondence with the user ID "Bob" is shown.

Image authentication processing which will be described later is performed in accordance with this registration processing.

A flow of password image authentication processing will be described with reference to FIG. 27.

Figure 27:
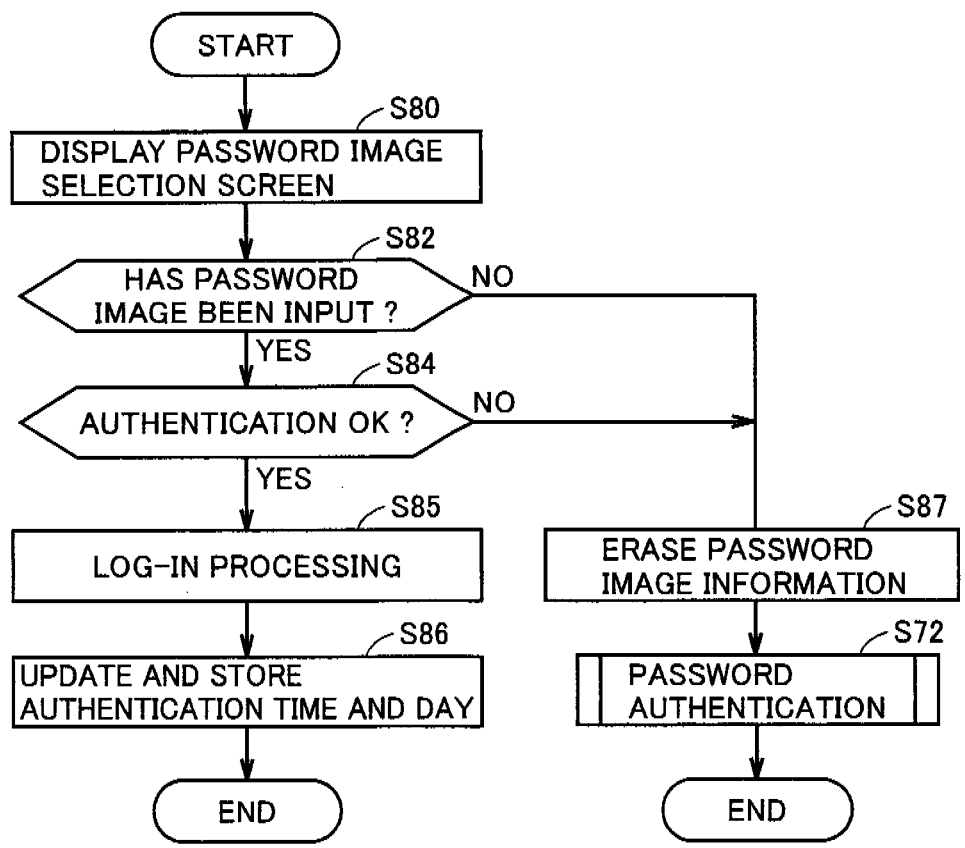
FIG. 27 is a flowchart illustrating a flow of password image authentication processing.

Referring to FIG. 27, initially, a password image selection screen is displayed (step S80). Specifically, password image authentication unit 408 causes display 206 to display a password image selection screen in response to an instruction from authentication method selection unit 404.

Figure 28:
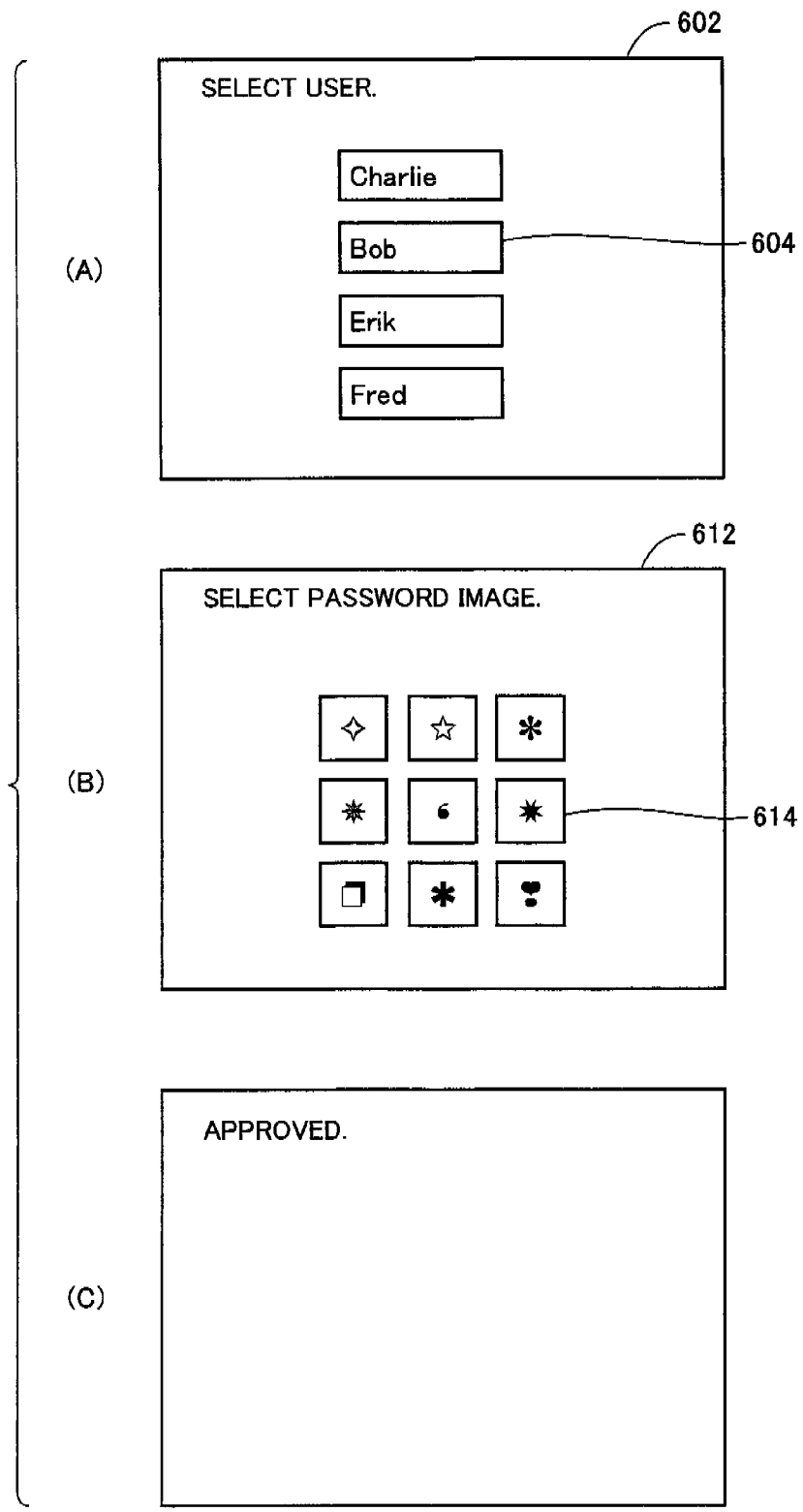
FIG. 28 is a diagram illustrating a screen for password image authentication processing according to the second embodiment of the present invention.

A screen for password image authentication processing according to the second embodiment of the present invention will be described with reference to FIG. 28.

FIG. 28(A) shows exemplary ID selection screen 602 according to the second embodiment of the present invention, as in FIG. 24(A) above.

Referring to FIG. 28(A), here, a case where four registered IDs are displayed as described above is shown. The user designates an item corresponding to his/her own ID (the user name in the present embodiment) using a mouse representing a pointing device.

A case where item 604 of the registered ID displayed as "Bob" representing the user name is provided is shown by way of example, and a case where "Bob" is designated will be described in the present embodiment.

FIG. 28(B) is a diagram illustrating an exemplary password image selection screen 612 according to the second embodiment of the present invention.

Referring to FIG. 28(B), here, a plurality of image objects are displayed and the user is invited to input his/her own password image that has been registered, from among the image objects. Then, the user inputs his/her own registered password image using a mouse representing a pointing device. In the present embodiment, an image object 614 is designated by way of example.

Then, as a result of input of the password image, password image authentication processing is started.

Referring again to FIG. 27, thereafter, whether a password image has been input or not is determined (step S82). Specifically, password image authentication unit 408 makes determination based on whether or not a password image has been input in password image selection screen 612 described above. When a password image has not been input (NO in step S82), the process proceeds to step S87. Specifically, though not shown, such a case corresponds to designation of a "Cancel" button with a mouse or the like.

Then, when it is determined that a password image has been input (YES in step S82), whether authentication is OK or not is thereafter determined (step S84). Specifically, password image authentication unit 408 determines whether the input password image matches with the password image registered in the authentication table or not. Then, when the password images match with each other, authentication is determined as OK.

When authentication is determined as OK (YES in step S84), log-in processing is performed (step S85). Specifically, password image authentication unit 408 notifies CPU 10 of approval. PC 110 can thus be used.

FIG. 28(C) is a diagram showing a case where authentication of a password image was successful.

Referring to FIG. 28(C), here, an indication as "approved" is shown.

With such an indication, the user is notified of approval.

According to such a configuration, security is ensured by password authentication processing, and in authentication satisfying a prescribed condition, authentication can be carried out in a simplified manner by carrying out password image authentication, which contributes to user's convenience. Namely, in the present embodiment, when the current time is within ten minutes from start-up of the screen saver, password image authentication is carried out. Therefore, in returning after start-up of the screen saver, simplified authentication processing can be carried out by inputting a password image, so that burden imposed on the user, that is, necessity of repeated password authentication, can be alleviated and user's convenience can be improved.

Referring again to FIG. 27, thereafter, the authentication time is updated and stored (step S86). Specifically, password image authentication unit 408 has the time of approval registered as the authentication time in the item field of the corresponding ID in the authentication table. Namely, the authentication time is updated. Then, the process ends (end). By updating the authentication time, the validity period of the password image can be re-started.

Meanwhile, when it is determined in step S84 that authentication was NG (NO in step S84), password image information is erased (step S87). Since password image authentication is a simplified authentication processing scheme, if a password image is valid even after failure in authentication, a malicious third party may find out the password image.

Then, password authentication is carried out (step S72). As password authentication is the same as described with reference to FIG. 25, detailed description thereof will not be repeated.

Specifically, password authentication unit 406 carries out password authentication when authentication was NG, so that user's convenience can be improved.

FIG. 29 is a diagram illustrating a flow of processing in registration in the authentication table according to the second embodiment of the present invention when password image authentication processing is performed.

Referring to FIG. 29(A), here, a case where a password "Ow8gcA", a password image "none", and an authentication time "08/12/14 17:03:15" are registered in correspondence with the user ID "Alice" is shown. In addition, a case where a password "wQ9DspX", a password image "YES (image object 610 in FIG. 24)", and an authentication time "09/1/7 11:20:34" are registered in correspondence with the user ID "Bob" is shown.

A case where password image authentication processing is performed for this user ID "Bob" will be described.

Referring to FIG. 29(B), here, a case where information in the authentication table is updated when authentication was OK is shown.

FIG. 29(B) is different from FIG. 29(A) in that the authentication time is registered as "09/1/7 11:35:14" in correspondence with the user ID "Bob", however, it is otherwise the same.

Referring to FIG. 29(C), here, a case where information in the authentication table is updated when authentication was NG is shown. Specifically, a case where the password image has been erased and the authentication time has been erased in correspondence with the user ID "Bob" is shown.

As a result of this processing, in performing authentication processing again, only password authentication is valid and thus security can be enhanced by this processing.

Password authentication is the same as described with reference to the flowchart in FIG. 25. Here, when password authentication is successful, a password image is set again and registered and thus a new password image can be registered, which contributes to user's convenience.

A case where password image setting unit 412 sets any one password image from among a plurality of images has been described above, however, the user may set a password image based on his/her intention.

Specifically, as described with reference to FIG. 14(B), any one password image may be selected from among a plurality of password images. According to such a configuration, since the user can decide on any password image, a user's preferred image can be set and convenience is improved.

[Third Embodiment]

A scheme with which authentication processing is performed in a simplified manner by using a password image has been described above.

In the present embodiment, a scheme with which authentication processing is performed in a simplified manner by using another scheme instead of a password image will be described.

A configuration of a PC according to a third embodiment of the present invention is the same as that of PC 110 described with reference to FIG. 19, however, it is different in that authentication processing unit 208 is replaced with an authentication processing unit 208#. Since the PC is otherwise the same, detailed description thereof will not be repeated.

As described above, the PC according to the third embodiment of the present invention performs authentication processing at the time of turn-on of power for boot-up and at the time of returning from the screen saver function.

A functional block in authentication processing unit 208# according to the third embodiment of the present invention will be described with reference to FIG. 30.

Figure 30:
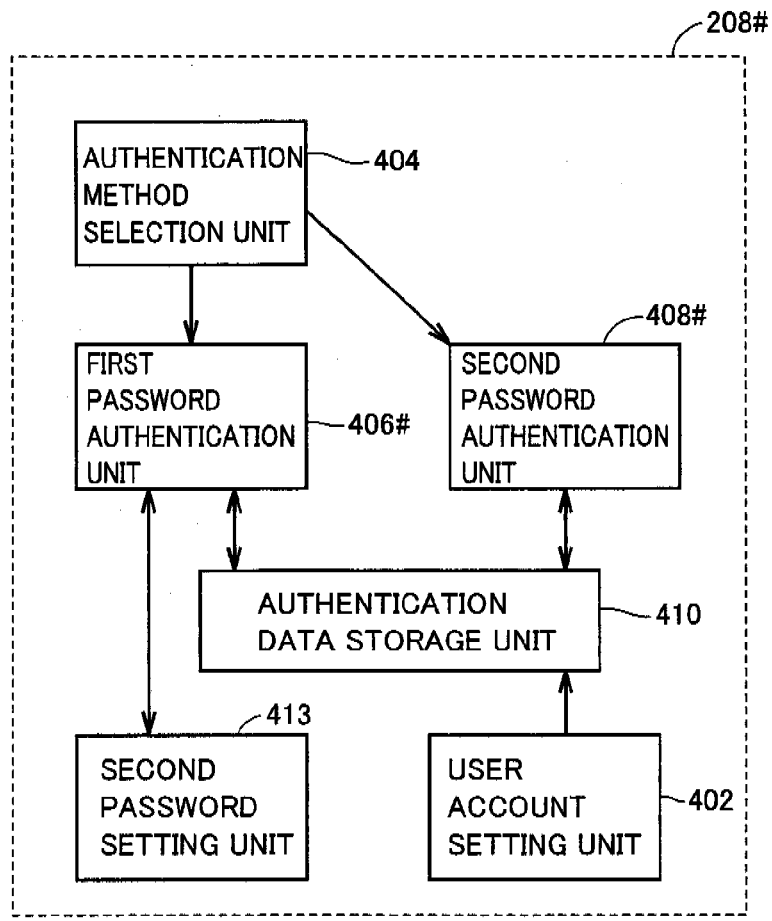
FIG. 30 is a diagram illustrating a functional block in an authentication processing unit 208# according to a third embodiment of the present invention.

Referring to FIG. 30, authentication processing unit 208# includes user account setting unit 402, authentication method selection unit 404, a first password authentication unit 406#, a second password authentication unit 408#, authentication data storage unit 410, and a second password setting unit 413.

User account setting unit 402 performs processing for setting a user account.

Authentication method selection unit 404 selects between authentication processing using first password authentication unit 406# and authentication processing using second password authentication unit 408#.

First password authentication unit 406# carries out password authentication in accordance with a first scheme (also referred to as first password authentication) in accordance with a user's input instruction.

Second password authentication unit 408# carries out password authentication in accordance with a second scheme (also referred to as second password authentication) in accordance with a user's input instruction.

Authentication data storage unit 410 has an authentication table in which authentication data to be used for authentication is stored.

Though the description will be given later, second password setting unit 413 sets a password to be used in second password authentication unit 408#.

Since the setting processing in user account setting unit 402 is the same as described with reference to FIG. 22, detailed description thereof will not be repeated.

User account setting screen 500 will be described with reference to FIG. 31.

Figure 31:
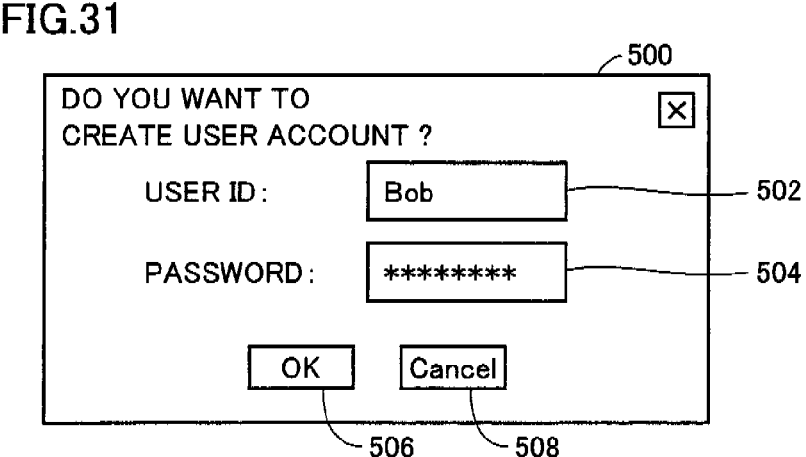
FIG. 31 is a diagram illustrating user account setting screen 500.

Referring to FIG. 31, user account setting screen 500 the same as in FIG. 22 is shown. Since the screen is the same as in FIG. 22, detailed description thereof will not be provided.

In the present embodiment, description will be given assuming that the user ID and the password are set in the user account setting screen above.

The authentication table stored in authentication data storage unit 410 is substantially the same as that described with reference to FIG. 8, however, an item of ON or OFF of the password image authentication function is not provided. Items of a user ID, a password, a simplified password, and an authentication time are provided. Since the authentication table is otherwise the same, detailed description thereof will not be repeated.

Authentication processing in the PC according to the third embodiment of the present invention will be described with reference to FIG. 32.

Figure 32:
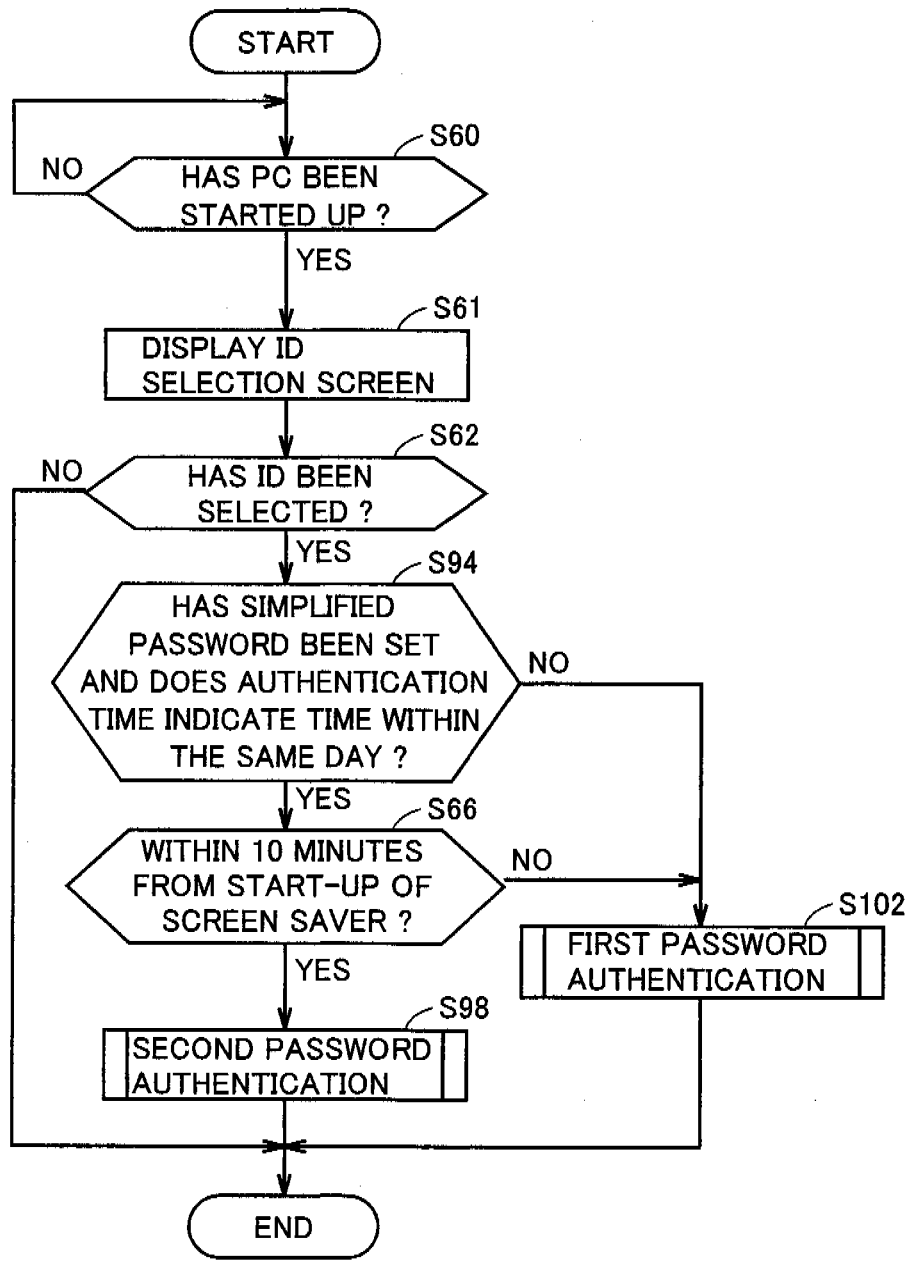
FIG. 32 is a flowchart illustrating authentication processing in a PC according to the third embodiment of the present invention.

Referring to FIG. 32, initially, whether the PC has been started up or not is determined (step S60). Specifically, determination that the PC has been started up is made when power is turned on by using a not-shown power button. In addition, start-up of the PC includes returning from the screen saver after start up thereof in the absence of an operation of PC 110 for a prescribed period of time.

When the PC is started up, CPU 201 starts up authentication processing unit 208# in the PC and performs authentication processing.

Thereafter, an ID selection screen is displayed (step S61). Specifically, authentication method selection unit 404 described with reference to FIG. 30 reads the authentication table stored in authentication data storage unit 410 and causes the registered ID(s) to be displayed on display 206 as the ID selection screen under the control of display control unit 205.

Figure 33:
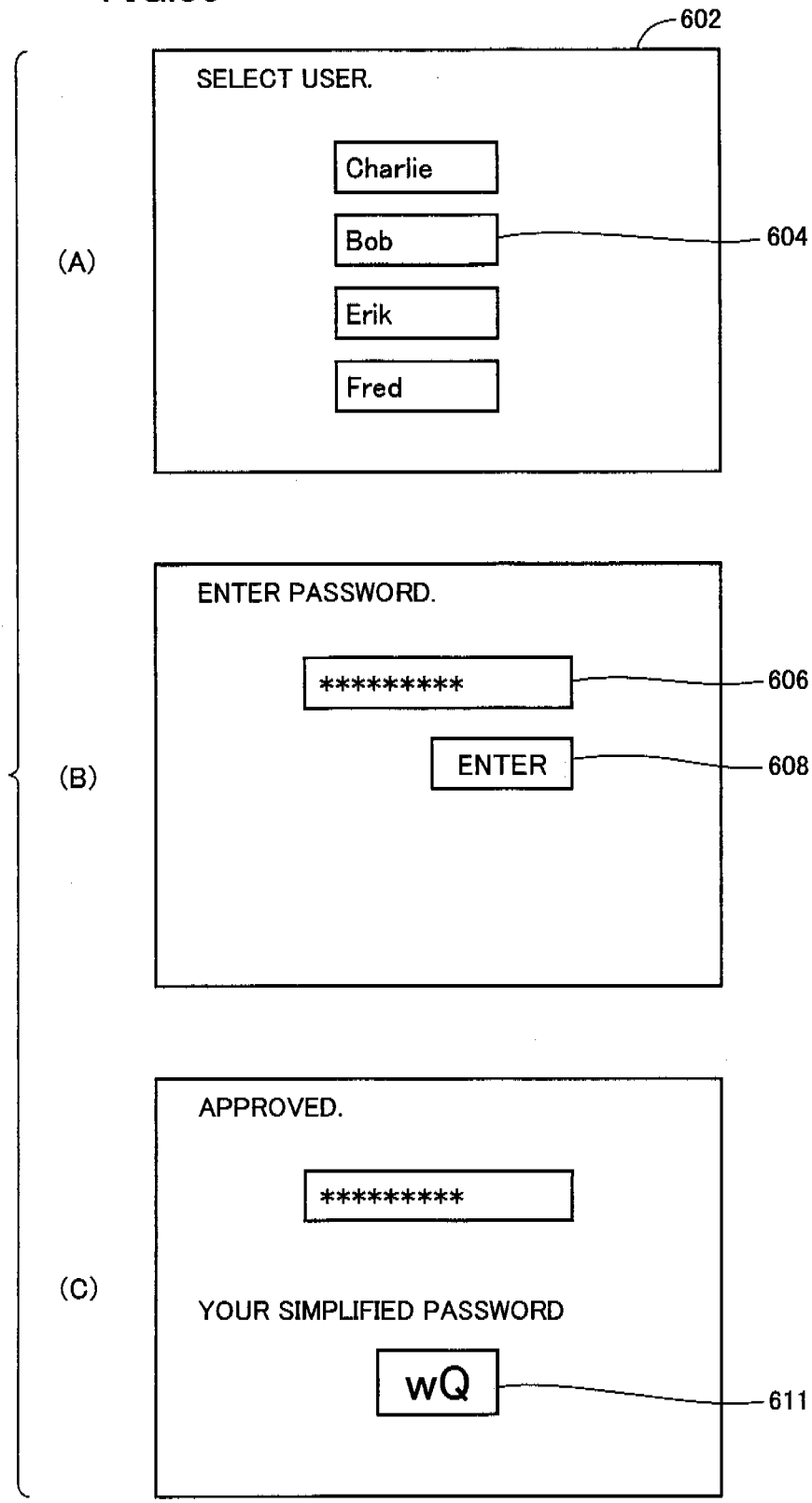
FIG. 33 is a diagram illustrating an exemplary screen for authentication processing according to the third embodiment of the present invention.

An exemplary screen for authentication processing according to the third embodiment of the present invention will be described with reference to FIG. 33

FIG. 33(A) is a diagram illustrating exemplary ID selection screen 602 according to the third embodiment of the present invention.

Referring to FIG. 33(A), here, a case where four registered IDs are displayed is shown. The user designates an item corresponding to his/her own ID (the user name in the present embodiment) using a mouse or the like representing a pointing device.

Here, a case where item 604 of the registered ID displayed as "Bob" representing the user name is provided is shown by way of example, and a case where "Bob" is designated will be described in the present embodiment.

Referring again to FIG. 32, thereafter, whether an ID has been selected or not is determined (step S62). Specifically, authentication method selection unit 404 determines whether or not an item corresponding to an ID has been designated in the ID selection screen described above.

Thereafter, when it is determined that an ID has been selected (YES in step S62), whether or not a simplified password is set and the authentication time indicates a time within the same day (step S94). Specifically, authentication method selection unit 404 reads the authentication table stored in authentication data storage unit 410 and determines whether or not the authentication time indicates a time within the same day if the authentication time has been registered for the corresponding ID.

Then, when authentication method selection unit 404 determines that the simplified password is set and the authentication time indicates a time within the same day (YES in step S94), authentication method selection unit 404 thereafter determines whether the current time is within ten minutes from start-up of the screen saver or not (step S66). Specifically, authentication method selection unit 404 determines whether the current time is within ten minutes or not based on comparison between the time of start-up of the screen saver and the current time.

When it is determined in step S66 that the current time is within ten minutes from start-up of the screen saver (step S66), second password authentication is carried out (step S98). Specifically, authentication method selection unit 404 instructs second password authentication unit 408# to carry out password authentication in accordance with the second scheme. Password authentication in accordance with the second scheme will be described later.

Meanwhile, when it is determined that an ID has not been selected (NO in step S62), the authentication processing ends (end). For example, though not shown, authentication processing ends when "cancel" or the like is pressed. In such a case, the PC is set to be unusable.

Meanwhile, when it is determined in step S94 that a simplified password is set but the authentication time does not indicate a time within the same day (NO in step S94), the process proceeds to step S102. Specifically, authentication method selection unit 404 instructs first password authentication unit 406# to carry out password authentication in accordance with the first scheme. Password authentication in accordance with the first scheme will be described later.

Meanwhile, when it is determined in step S66 that the current time is not within ten minutes from start-up of the screen saver (NO in step S66), the process proceeds to step S102. Specifically, authentication method selection unit 404 instructs first password authentication unit 406# to carry out password authentication. For example, since the screen saver is not started up at the time of turn-on of power for boot-up, password authentication is carried out.

Password authentication processing in accordance with the first scheme in step S102 will be described with reference to FIG. 34.

Password authentication processing in accordance with the first scheme is authentication processing based on common comparison between passwords.

Figure 34:
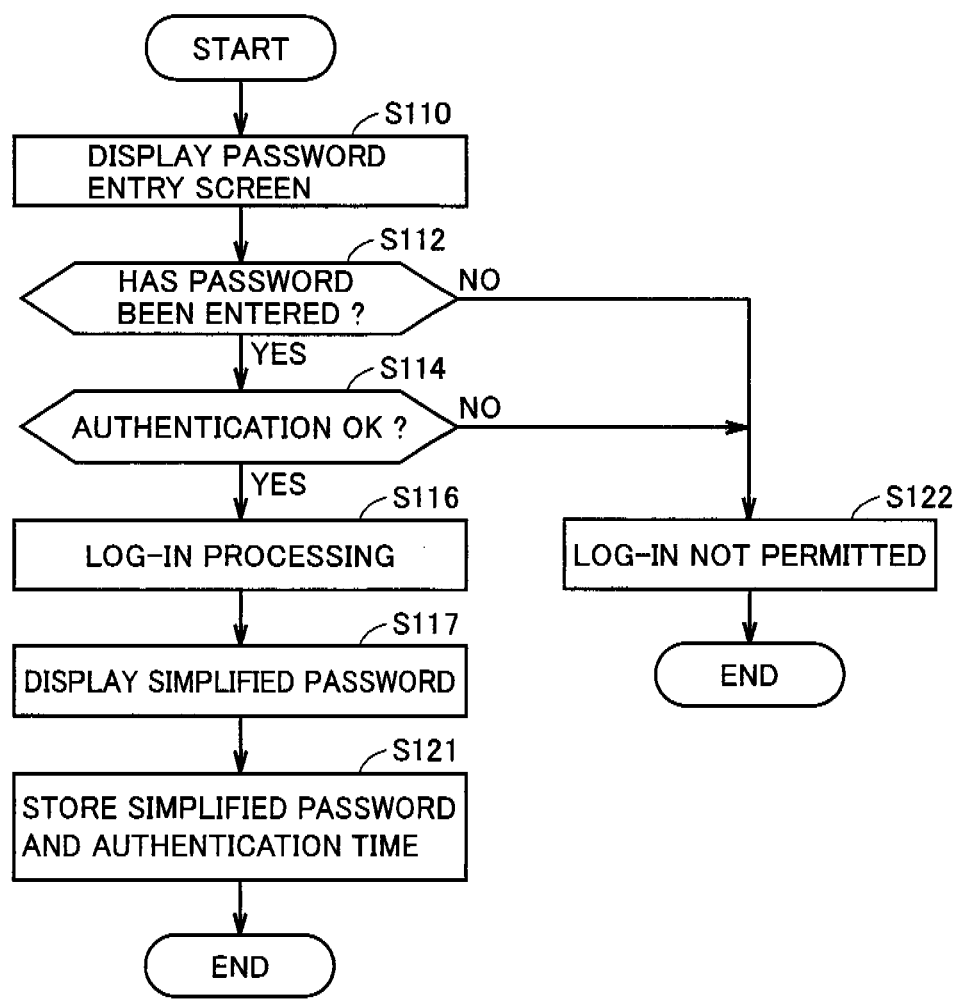
FIG. 34 is a flowchart illustrating password authentication processing in accordance with a first scheme in step S102.

Referring to FIG. 34, initially, a password entry screen is displayed (step S110). Specifically, first password authentication unit 406# causes display 206 to display a password entry screen in response to an instruction from authentication method selection unit 404.

FIG. 33(B) is a diagram illustrating an exemplary password entry screen according to the third embodiment of the present invention.

Referring to FIG. 33(B), here, a case where an indication to enter password is shown and input field 606 for entry of a password is provided is shown. The user enters a password registered by the user himself/herself in input field 606, by using a keyboard implementing input portion 209.

Then, enter button 608 is pressed. Password authentication processing is thus started.

Referring again to FIG. 34, thereafter, whether a password has been entered or not is determined (step S112). Specifically, first password authentication unit 406# makes determination based on whether or not a password was entered in input field 606 and enter button 608 was pressed in the aforementioned password entry screen.

Then, when it is determined that a password was entered (YES in step S112), whether authentication is OK or not is thereafter determined (step S114). Specifically, first password authentication unit 406# determines whether the password entered in input field 606 matches with the password registered in the authentication table or not. Then, when the passwords match with each other, authentication is determined as OK.

When authentication is determined as OK (YES in step S114), log-in processing is thereafter performed (step S116). Specifically, first password authentication unit 406# notifies CPU 10 of approval. PC 110 can thus be used. As described above, for example, when power is turned on for boot-up, the screen saver has not yet been started up and hence password authentication is carried out. Namely, when power is turned on for boot-up, security can be enhanced by having common password authentication carried out.

Thereafter, a simplified password is displayed (step S117). First password authentication unit 406# instructs second password setting unit 413 to set a simplified password restricted in terms of the number of characters. Second password setting unit 413 sets a new, different password (simplified password) based on the registered password, under a prescribed rule. In the present embodiment, two characters at the beginning of the registered password are extracted by way of example.

Then, second password setting unit 413 extracts two characters at the beginning from the registered password, and sets and outputs a simplified password to first password authentication unit 406#. Then, first password authentication unit 406# causes display 206 to display the simplified password set by second password setting unit 413. It is noted that display of a simplified password may be turned off after display for a prescribed period of time, such as approximately one second, or it may be turned off at any timing desired by the user.

A case where a simplified password according to the third embodiment of the present invention is displayed will be described with reference to FIG. 33(C).

Referring to FIG. 33(C), here, a case where an indication as "approved" is shown and a password "wQ" 611 is displayed under the indication "your simplified password" is shown. The simplified password is registered as an authentication key to be used in password authentication in accordance with the second scheme which will be described later.

Referring again to FIG. 34, thereafter, the simplified password and the authentication time are stored (step S121). Specifically, first password authentication unit 406# has the displayed password registered as the simplified password and has the time of approval registered as the authentication time, in the item fields of the corresponding ID in the authentication table of authentication data storage unit 410. Then, the process ends (end).

Meanwhile, when it is determined in step S114 that authentication was NG (NO in step S114), log-in is not permitted (step S122). As a result of this processing, security can be ensured by prohibiting use of a function of PC 110 by the user who failed in log-in.

FIG. 35 is a diagram illustrating a flow of processing in registration in the authentication table according to the third embodiment of the present invention when password authentication processing is performed.

Referring to FIG. 35(A), here, a case where a password "Ow8gcA", a simplified password "none", and an authentication time "08/12/14 17:03:15" are registered in correspondence with the user ID "Alice" is shown.

Referring to FIG. 35(B), then, a case where a password "wQ9DspX", a simplified password "wQ", and an authentication time "09/1/7 11:20:34" are registered in correspondence with the user ID "Bob" is shown.

Password authentication processing in accordance with the second scheme which will be described later is performed in accordance with this registration processing.

A flow of password authentication processing in accordance with the second scheme will be described with reference to FIG. 36.

Figure 36:
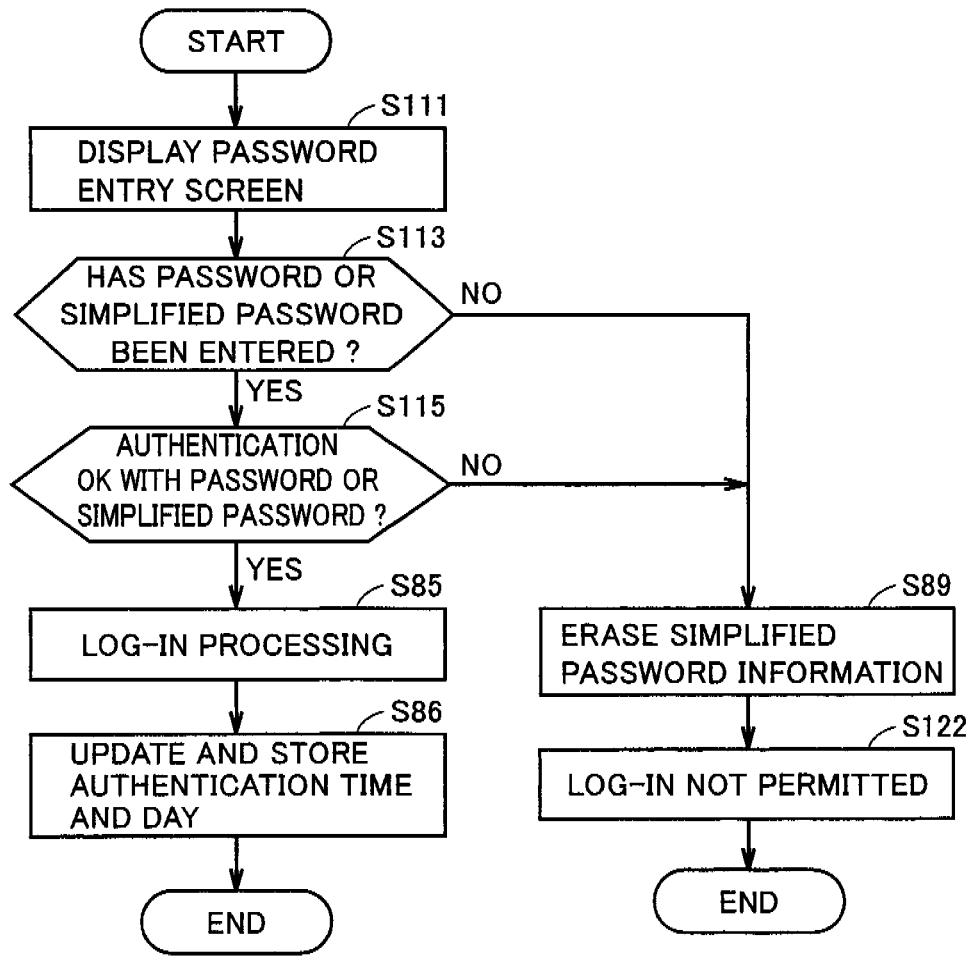
FIG. 36 is a flowchart illustrating a flow of password authentication processing in accordance with a second scheme.

Referring to FIG. 36, initially, a password entry screen is displayed (step S111). Specifically, second password authentication unit 408# causes display 206 to display a password entry screen in response to an instruction from authentication method selection unit 404.

A screen for password authentication processing according to the third embodiment of the present invention will be described with reference to FIG. 37.

FIG. 37(A) shows exemplary ID selection screen 602 according to the third embodiment of the present invention, as in FIG. 24(A) above.

Referring to FIG. 37(A), here, a case where four registered IDs are displayed as described above is shown. The user designates an item corresponding to his/her own ID (the user name in the present embodiment) using a mouse representing a pointing device.

A case where item 604 of the registered ID displayed as "Bob" representing the user name is provided is shown by way of example, and a case where "Bob" is designated will be described in the present embodiment.

FIG. 37(B) is a diagram illustrating an exemplary password entry screen according to the third embodiment of the present invention.

Referring to FIG. 37(B), here, an indication that "Enter password. Simplified password may be accepted." is shown and an input field 631 is provided. The user can enter a password registered by the user himself/herself or a simplified password in input field 631, by using a keyboard implementing input portion 209.

Then, an enter button 632 is pressed. Second password authentication processing is thus started.

Referring again to FIG. 36, thereafter, whether a password or a simplified password has been entered or not is determined (step S113). Specifically, second password authentication unit 408# makes determination based on whether or not a password or a simplified password has been entered in input field 631 and enter button 632 was pressed in the password entry screen described above. When entry into input field 631 was not made (NO in step S113), the process proceeds to step S89. Specifically, though not shown, such a case corresponds to designation of a "Cancel" button with a mouse or the like.

Then, when it is determined that a password has been input (YES in step S113), whether authentication is OK or not is thereafter determined (step S115). Specifically, second password authentication unit 408# determines whether the password or simplified password entered in input field 631 matches with the password or simplified password registered in the authentication table or not. Then, when the passwords match with each other, authentication is determined as OK.

When authentication is determined as OK (YES in step S115), log-in processing is performed (step S85). Specifically, second password authentication unit 408# notifies CPU 10 of approval. The PC can thus be used.

FIG. 37(C) is a diagram showing a case where second password authentication was successful.

Referring to FIG. 37(C), here, an indication as "approved" is shown.

With such an indication, the user is notified of approval.

According to such a configuration, security is ensured by first password authentication, and in authentication satisfying a prescribed condition, authentication can be carried out in a simplified manner by carrying out second password authentication, which contributes to user's convenience. Namely, in the present embodiment, when the current time is within ten minutes from start-up of the screen saver, second password authentication is carried out. Therefore, in returning after start-up of the screen saver, simplified authentication processing can be carried out by carrying out second password authentication, so that burden imposed on the user, that is, necessity of repeated first password authentication, can be alleviated and user's convenience can be improved.

Referring again to FIG. 36, thereafter, the authentication time is updated and stored (step S86). Specifically, second password authentication unit 408# has the time of approval registered as the authentication time in the item field of the corresponding ID in the authentication table. Namely, the authentication time is updated. Then, the process ends (end). By updating the authentication time, the validity period of the simplified password can be re-started.

Meanwhile, when it is determined in step S115 that authentication was NG (NO in step S115), simplified password information is erased (step S89). Since second password authentication using a simplified password is a simplified authentication processing scheme, if a simplified password is valid even after failure in authentication, a malicious third party may find out the simplified password.

Meanwhile, when it is determined in step S113 that a password was not entered (NO in step S113) and when it is determined in step S115 that authentication was NG (NO in step S115), log-in is not permitted (step S122). As a result of this processing, security can be ensured by prohibiting use of a function of PC 110 by the user who failed in log-in.

FIG. 38 is a diagram illustrating a flow of processing in registration in the authentication table according to the third embodiment of the present invention when second password authentication processing is performed.

Referring to FIG. 38(A), here, a case where a password "Ow8gcA", a simplified password "none", and an authentication time "08/12/14 17:03:15" are registered in correspondence with the user ID "Alice" is shown. In addition, a case where a password "wQ9DspX", a simplified password "wQ", and an authentication time "09/1/7 11:20:34" are registered in correspondence with the user ID "Bob" is shown.

A case where second password authentication processing is performed for this user ID "Bob" will be described.

Referring to FIG. 38(B), here, a case where information in the authentication table is updated when authentication was OK is shown.

FIG. 38(B) is different from FIG. 38(A) in that the authentication time is registered as "09/1/7 11:35:14" in correspondence with the user ID "Bob", however, it is otherwise the same.

Referring to FIG. 38(C), here, a case where information in the authentication table is updated when authentication was NG is shown. Specifically, a case where simplified password information has been erased and the authentication time has been erased in correspondence with the user ID "Bob" is shown.

As a result of this processing, in performing authentication processing again, only first password authentication is valid and thus security can be enhanced by this processing.

First password authentication is the same as described with reference to the flowchart in FIG. 34. Here, when password authentication is successful, a simplified password is set again and registered and thus a new simplified password can be registered, which contributes to user's convenience.

A scheme with which second password setting unit 413 extracts two characters at the beginning of a first password under a prescribed rule to set a simplified password serving as a second password in the present embodiment has been described above, however, the scheme is not particularly limited thereto and a simplified password may be set using other schemes.

For example, instead of two characters at the beginning, two characters in the end may be employed, or a prescribed number of characters may be extracted without limited to two characters.

Alternatively, one character in each set of five characters in continuously arranged password and user ID may be extracted. Alternatively, a simplified password may be set by shifting a character extracted as above to a next character one by one. For example, regarding characters arranged in the order of a to z in the alphabet, such shifting as c→d or z→a may be adopted. Alternatively, a number may be shifted in the ascending order to a next number, without limited to the alphabet. For example, such shifting as 8→9 may be adopted.

Alternatively, the shifting scheme above may be combined for use with extraction of two characters described above.

A rule for generating a simplified password above may be selected by the user or a simplified password itself may arbitrarily be set by the user.

Figure 37:
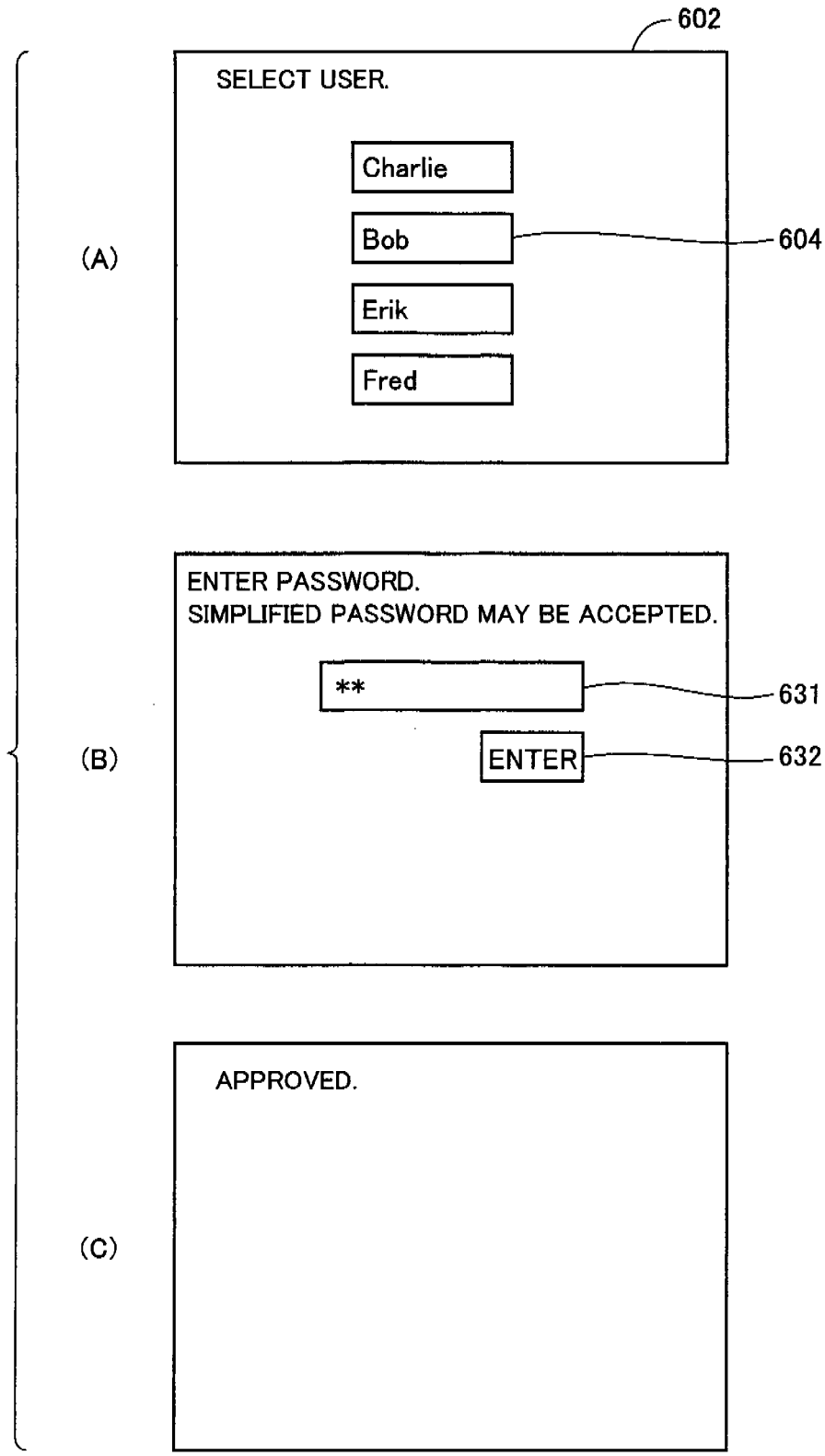
FIG. 37 is a diagram illustrating a screen for password authentication processing according to the third embodiment of the present invention.

Though the scheme above permits entry of any of a password and a simplified password in FIG. 37, in order to enhance security, two password entry screens are displayed separately to have the user enter passwords.

It is noted that, regarding each component for controlling the apparatus above, a program causing a computer to function to carry out control as described in the flow above can also be provided. Such a program may be recorded in a computer-readable recording medium such as a flexible disc, a CD-ROM (Compact Disk-Read Only Memory), a ROM (Read Only Memory), a RAM (Random Access Memory), and a memory card, to be attached to a computer, and may be provided as a program product. Alternatively, a program may be provided as recorded in a recording medium such as a hard disk contained in a computer. Alternatively, a program may be provided by downloading through a network.

A program may invoke a necessary module from among program modules provided as a part of the operation system (OS) of the computer at prescribed timing in prescribed sequences and cause the module to perform processing. Here, the program itself does not include the module above but processing is performed in cooperation with the OS. Such a program not including a module may also be encompassed in the program according to the present invention.

In addition, the program according to the present invention may be provided as incorporated as a part of another program. In this case as well, the program itself does not include the module included in another program but processing is performed in cooperation with another program. Such a program incorporated in another program may also be encompassed in the program according to the present invention.

A provided program product is installed in a program storage portion such as a hard disk and executed. It is noted that the program product includes a program itself and a recording medium recording a program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information processing apparatus, comprising:
 a display for displaying an authentication screen; and a processor configured to perform authentication processing in response to a user's input instruction requesting access via said authentication screen, said authentication processing including at least one of a first authentication scheme and a second authentication scheme, wherein user input for the second authentication scheme is shorter than user input for said first authentication scheme, and wherein each of the first authentication scheme and the second authentication scheme separately provides the same type of access, said processor executing said first authentication scheme to provide access if successful authentication of the user has not occurred within a predetermined period of time, and executing said second authentication scheme to provide access, without requiring said first authentication scheme, when a user input instruction is entered within a predetermined time period after a previous user input instruction successfully provided access in accordance with said first authentication scheme, wherein said processor is further configured to cause the display to display registered key data as the user input for said second authentication scheme that is shorter than the user input for said first authentication scheme, upon successful authentication of the user by said first authentication scheme, and wherein said processor is capable of receiving an instruction from the user disabling the registered key data for use in a subsequent authentication processing, during said display of the registered key data.

2. The information processing apparatus according to claim 1, wherein
said first authentication scheme corresponds to password authentication.

3. The information processing apparatus according to claim 1, wherein
said second authentication scheme corresponds to authentication using a password image.

4. The information processing apparatus according to claim 1, wherein
said second authentication scheme corresponds to password authentication restricted in the number of characters, which is smaller than in said first authentication scheme.

5. The information processing apparatus according to claim 4, wherein
password authentication in accordance with said first authentication scheme is approved when first registered key data registered in advance matches with key data input in accordance with said user's input instruction, and
in said password authentication restricted in the number of characters, key data generated under a prescribed rule from said first registered key data is registered as second registered key data.

6. The information processing apparatus according to claim 5, wherein
said second registered key data corresponds to data obtained by extracting a part of a character string of said first registered key data.

7. The information processing apparatus according to claim 5, wherein
said second registered key data corresponds to data obtained by replacing a character in said first registered key data with a different character.

8. The information processing apparatus according to claim 1, wherein
said first authentication scheme corresponds to authentication in a secure printing function.

9. The information processing apparatus according to claim 1, wherein
said first authentication scheme corresponds to authentication for logging in the apparatus.

10. The information processing apparatus according to claim 1, wherein
in said first authentication scheme, an instruction to enter at least one of a user ID and a password is issued.

11. The information processing apparatus according to claim 1, wherein
said processor has a time and day of a successful providing of access registered, when authentication processing in accordance with said second authentication scheme led to successful providing of access in response to said user's input instruction for said second authentication scheme.

12. The information processing apparatus according to claim 11, wherein
said processor checks a validity period during which authentication processing in accordance with said second authentication scheme is permitted.

13. The information processing apparatus according to claim 12, wherein
said processor performs authentication processing in accordance with said second authentication scheme during the validity period during which authentication processing in accordance with said second authentication scheme is permitted, based on said time and day of the successful providing of access.

14. The information processing apparatus according to claim 13, wherein
said processor updates the time and day of the successful providing of access when authentication processing in accordance with said second authentication scheme led to successful providing of access.

15. The information processing apparatus according to claim 1, wherein
said processor executes said first authentication scheme after authentication processing in accordance with said second authentication scheme failed.

16. A method of controlling an information processing apparatus, comprising the steps of:
displaying an authentication screen; and
performing authentication processing, by a processor, in response to a user's input instruction requesting access via said authentication screen,
said authentication processing including at least one of a first authentication scheme and a second authentication scheme, wherein user input for the second authentication scheme is shorter than user input for said first authentication scheme, and wherein each of the first authentication scheme and the second authentication scheme separately provides the same type of access,
executing said first authentication scheme to provide access if successful authentication of the user has not occurred within a predetermined period of time, and
executing said second authentication scheme to provide access, without requiring said first authentication scheme, when a user's input instruction is entered within a predetermined time period after a previous user input instruction successfully provided access in accordance with said first authentication scheme;
displaying registered key data as the user input for said second authentication scheme that is shorter than the user input for said first authentication scheme, upon successful authentication of the user by said first authentication scheme; and disabling the registered key data for use in a subsequent authentication processing if a user gives an instruction to disable the registered key data, during said displaying of the registered key data.

17. A non-transitory recording medium storing a control program executed in a computer representing an information processing apparatus, said control program causing the computer to perform processing including the steps of;

displaying an authentication screen, and performing authentication processing in response to a user's input instruction requesting access via said authentication screen, said authentication processing including at least one of a first authentication scheme and a second authentication scheme, wherein user input for the second authentication scheme is shorter than user input for said first authentication scheme, and wherein each of the first authentication scheme and the second authentication scheme separately provides the same type of access, executing said first authentication scheme to provide access if successful authentication of the user has not occurred within a predetermined period of time, and executing said second authentication scheme to provide access, without requiring said first authentication scheme, when a user's input instruction is entered within a predetermined time period after a previous user input instruction successfully provided access in accordance with said first authentication scheme;

displaying registered key data as the user input for said second authentication scheme that is shorter than the user input for said first authentication scheme, upon successful authentication of the user by said first authentication scheme; and disabling the registered key data for use in a subsequent authentication processing if a user gives an instruction to disable the registered key data, during said displaying of the registered key data.

\* \* \* \* \*